United States Patent [19]

Van Nostrand

[11] Patent Number: 5,008,752
[45] Date of Patent: Apr. 16, 1991

[54] DIGITAL IMAGE INTERPOLATOR WITH MULTIPLE INTERPOLATION ALGORITHMS

[75] Inventor: Lance Van Nostrand, Rochester, N.Y.

[73] Assignee: Eastman Kodak Company, Rochester, N.Y.

[21] Appl. No.: 368,458

[22] Filed: Jun. 16, 1989

[51] Int. Cl.[5] .............................................. H04N 5/14
[52] U.S. Cl. .................................... 358/160; 358/451; 358/462
[58] Field of Search ............... 358/451, 452, 462, 147, 358/160, 11, 163; 382/47

[56] References Cited

U.S. PATENT DOCUMENTS

| | | |
|---|---|---|
| 4,468,693 | 8/1984 | Fujita et al. . |
| 4,517,600 | 5/1985 | Reitmeier ............................ 358/163 |
| 4,577,235 | 3/1986 | Kannapell et al. .................. 358/462 |
| 4,578,812 | 3/1986 | Yui . |
| 4,595,958 | 6/1986 | Anderson, Jr. et al. . |
| 4,605,965 | 8/1986 | Reitmeier ............................ 358/147 |
| 4,677,482 | 6/1987 | Lewis, Jr. ............................ 358/11 |
| 4,682,300 | 7/1987 | Deto et al. . |
| 4,860,118 | 8/1989 | Arimoto ............................. 358/451 |
| 5,700,232 | 10/1987 | Abt et al. . |

FOREIGN PATENT DOCUMENTS 0002483 1/1984 Japan ................................ 358/462

OTHER PUBLICATIONS

"Cubic Convolution Interpolation for Digital Image Processing" by Robert G. Keys, IEEE Transactions on Acoustics, Speech & Signal Processing, vol. ABSP-29, No. 6, Dec. 1981, pp. 1153-1160.

Primary Examiner—James J. Groody
Assistant Examiner—David E. Harvey
Attorney, Agent, or Firm—Thomas H. Close

[57] ABSTRACT

An interpolator for enlarging or reducing a digital image includes an interpolation coefficient memory containing interpolation coefficients representing several different one dimensional interpolation kernels. A row interpolator receives image pixel values, retrieves interpolation coefficients from the memory, and produces interpolated pixel values by interpolating in a row direction. A column interpolator receives multiple rows of interpolated pixel values from the row interpolator, retrieves interpolation coefficients from the memory, and produces rows of interpolated pixel values by interpolating in a column direction. A logic and control unit monitors the content of the input data and switches between interpolation kernels to provide optimum interpolation for each type of content.

4 Claims, 20 Drawing Sheets

DIGITAL IMAGE INTERPOLATOR WITH MULTIPLE INTERPOLATION ALGORITHMS

CROSS-REFERENCE TO RELATED APPLICATION

Reference is hereby made to U.S. patent application No. 367,177 entitled "Digital Image Interpolator with Undersamples Interpolation Kernel" by R. Krogstad, and Application No. 367,168 entitled "Digital Image Interpolator" by R. Kerr and R. Krogstad, both filed on even data herewith.

TECHNICAL FIELD

The present invention relates to interpolators for processing digital images, and more particularly to such interpolators having multiple interpolation algorithms for processing of digital images having different types of image content, such as diagnostic x ray images having alphanumeric annotations thereon.

BACKGROUND ART

U.S. Pat. No. 4,578,812 issued Mar. 25, 1986 to Yui discloses hardware for performing high speed two dimensional interpolation on a digital image by the method of cubic convolution. In the two-dimensional cubic convolution interpolation algorithm implemented by the hardware, sixteen pixels from the original image surrounding an interpolation site in a two-dimensional array are simultaneously multiplied by 16 corresponding interpolation coefficients (weight factors) and the 16 products are added to produce the interpolated value at the interpolation site. The interpolation coefficients represent samples of a two dimensional cubic convolution interpolation kernel, and are stored in a digital memory. The cubic convolution kernel is sampled at a granularity of 32×32 samples between original pixels. The samples are stored as 12-bit values. As a result, the total storage requirements for the interpolation coefficients is 32×32×12×16=196,608 bits, where the "16" indicates the 16 coefficients applied to the 16 pixel values to obtain the interpolated value. The storage requirement is thus about 192K bits for the interpolation coefficients.

For high resolution images, such as diagnostic x-ray images, it is desirable to sample the cubic convolution kernel at a much finer granularity, say 256×256, and to record the coefficients to a higher accuracy, say 16 bits, to provide a more accurate interpolation and finer divisions between magnification choices. This would require 256×256×16×16 which approximately equals 16 M bits of read only memory for storing the interpolation coefficients. The provision of such a large amount of read only memory would be very costly and difficult to address.

Furthermore, it is known that for certain types of images cubic convolution does not produce an optimum interpolated image and other interpolation algorithms such as bilinear or replication are preferred. U.S. Pat. No. 4,468,693 discloses an interpolator that can be manually switched between cubic convolution, bilinear, and nearest neighbor interpolation depending upon the kinds of images to be interpolated. However, when two kinds of subject matter such as pictorial information and text exist in the same image, no selection will provide optimum interpolation. It is therefore the object of the present invention to provide apparatus for performing a variety of interpolation techniques on a digital image that overcomes the shortcoming noted above.

DISCLOSURE OF THE INVENTION

The object is achieved according to the present invention by providing interpolation apparatus for performing interpolation on a set of signal values. The interpolation apparatus including means for performing one of a plurality of interpolation algorithms on the signal values, and means responsive to the signal values for automatically switching between interpolation algorithms. In a preferred embodiment of the invention, the signal values represent pixels in a digital image, and the means responsive to the signal values responds to differences in neighboring pixel values. In particular, the interpolation algorithms include cubic convolution and replication, and the switching means responds to a difference exceeding a predetermined threshold value to switch to replication interpolation.

According to a further aspect of the invention, the switching means includes means for employing a selected interpolation algorithm for a minimum number of times before switching to another interpolation algorithm, so that the selected algorithm can act across a sharp transition in signal values.

According to a still further aspect of the invention, the switching means includes means for detecting when the signal values are above a preselected threshold and when a particular algorithm was employed on a neighboring signal value, and employs the particular algorithm on the signal values above the threshold.

MODES OF CARRYING OUT THE INVENTION

Figure 1:
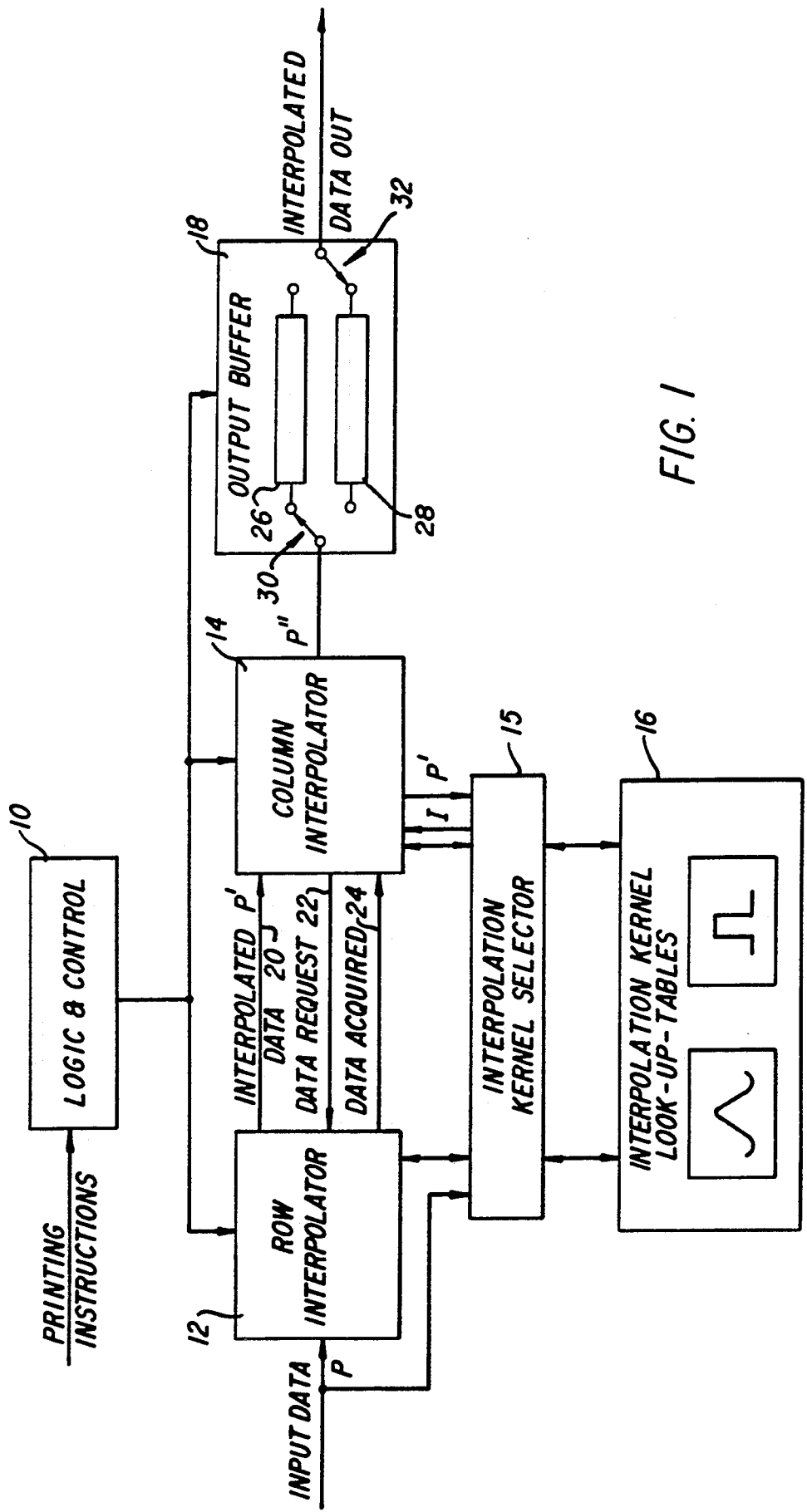
FIG. 1 is a block diagram of an interpolator according to the invention.

FIG. 1 is a schematic block diagram showing an interpolator for performing multiple interpolation algorithms according to the present invention. The interpolator receives digital image pixel data P, for example from a frame store memory (not shown), one row at a time, and produces interpolated digital image data P'' one row at a time, which can be supplied to a printer (not shown) or stored for future use for example in a frame store. The interpolator includes a logic and control unit 10 which calculates a horizontal sampling increment $h_H$ and a vertical sampling increment $h_v$ for the output images and controls the overall operation of the interpolator. The sampling increments h are determined by magnification factors that can represent expansion, reduction, or no change in the number of pixels in the image in the horizontal and vertical directions. The interpolator includes a row interpolator 12, a column interpolator 14, an interpolation kernel selector 15, an interpolation kernel lookup table 16, and an output buffer 18.

In operation, the logic and control unit 10 receives instructions regarding the number and size of input images to be printed on a particular output format, and calculates magnification factors to be applied to each image, based on the number of pixels in the original image, and the number of pixels to be provided in the interpolated output image. The row interpolator 12 retrieves pixel values along a row and interpolates pixel values P' between them by retrieving interpolation coefficients from one of the one-dimensional interpolation kernel lookup tables 16 determined by the interpolation kernel selector 15. The row interpolator 12 multiplies the pixel values by their respective interpolation coefficients and sums the product to produce the interpolated values P'. The interpolated pixel values P' from the row interpolator are supplied upon request to the column interpolator 14 on line 20. The column interpolator 14 requests data on line 22 and when the row interpolator 12 supplies the data, an acknowledgment is supplied on line 24.

The column interpolator 14 acquires an stores several rows of interpolated pixel data until it can start performing interpolation in a column direction on the stored data. When sufficient data has been acquired, the column interpolator 14 begins interpolating in a column direction to produce rows of interpolated values P'' between the rows supplied by the row interpolator 12.

The column interpolator 14 interpolates in a column direction by selecting a plurality of pixel values arranged in a column from the acquired rows, retrieving a corresponding plurality of interpolation coefficients from one of the lookup tables 16 determined by the interpolation kernel selector 15, and performing multiplication and addition of the products in a manner similar to the row interpolator 12. The column interpolator 14 provides rows of interpolated pixel values P'' to the output buffer 18, which is double buffered so that a row of interpolated pixel values can be read out while the next row is being read into the output buffer 18. Double buffering is produced as is known in the art by a pair of buffers 26 and 28 and multiplex switches 30 and 32.

One-dimensional interpolation by use of the coefficients stored in one of the lookup tables 16 will now be described. Interpolation can be described as:

$$P'(x) = \sum_{k=-1}^{2} P_k \cdot C\left(\frac{x - x_k}{h}\right) \quad (1)$$

where P' (x) represents the interpolated value, $$C\left(\frac{x - x_k}{h}\right)$$

is a value of the interpolation kernel at location $(x - x_k)$; h is the sample increment of the interpolated function, $x_k$ represents the location of the samples of input data and $P_k$ are the values of the input data at the interpolation nodes.

Figure 2:
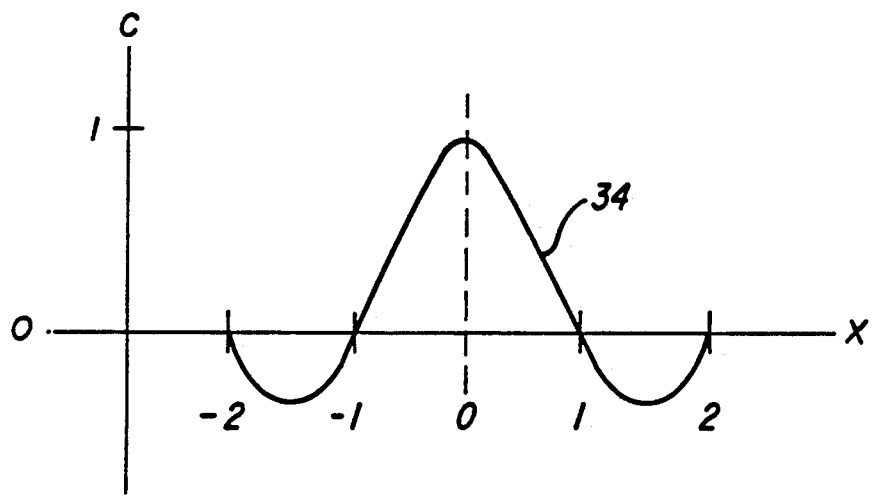
FIG. 2 is a graph showing a cubic convolution interpolation kernel.

An interpolation kernel is a function that converts sampled data into a continuous function, the resulting continuous function can then be resampled to obtain the interpolated sample values. For example, cubic convolution, which is particularly useful for continuous tone images, employs a kernel that is defined by piecewise cubic polynomials defined on the subintervals ($-2$, $-1$), ($-1,0$), ($0,1$), and ($1,2$). Outside the interval ($-2,2$) the kernel is zero. Evaluation of equation 1 for the cubic convolution kernel requires four consecutive data samples from the original image data. FIG. 2 is a graph showing the cubic convolution kernel 34 defined on the interval ($-2,2$). The scale of the X axis in FIG. 2 is equivalent to the spacing of the data samples in the original image.

Figure 3:
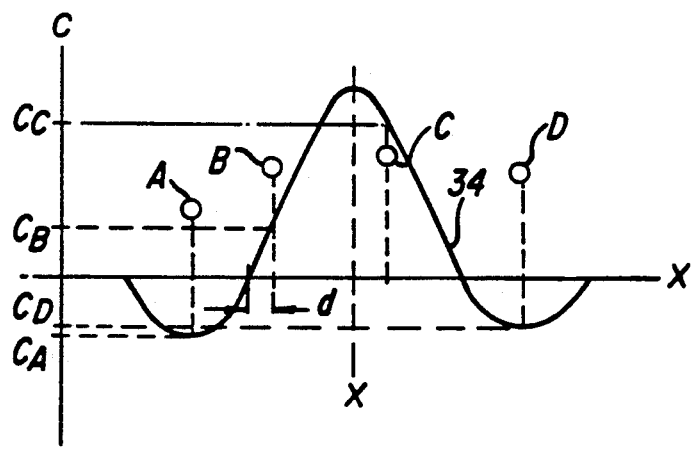
FIG. 3 is a graph useful in describing the method of interpolation by cubic convolution.

FIG. 3 illustrates how the interpolation kernel 34 is employed to compute an interpolated value at location x. Four consecutive data values from the original image data are shown as A, B, C, and D. To produce an interpolated value at location x, the interpolation kernel 34 is centered at x, and the values of the kernel are calculated at the locations of the original data samples. These values $C_A$, $C_B$, $C_C$, and $C_D$ are the interpolation coefficients. The interpolated value at x is:

$$P'(x) = (A \cdot C_A) + (B \cdot C_B) + (C \cdot C_C) + (D \cdot C_D). \quad (2)$$

Figure 4:
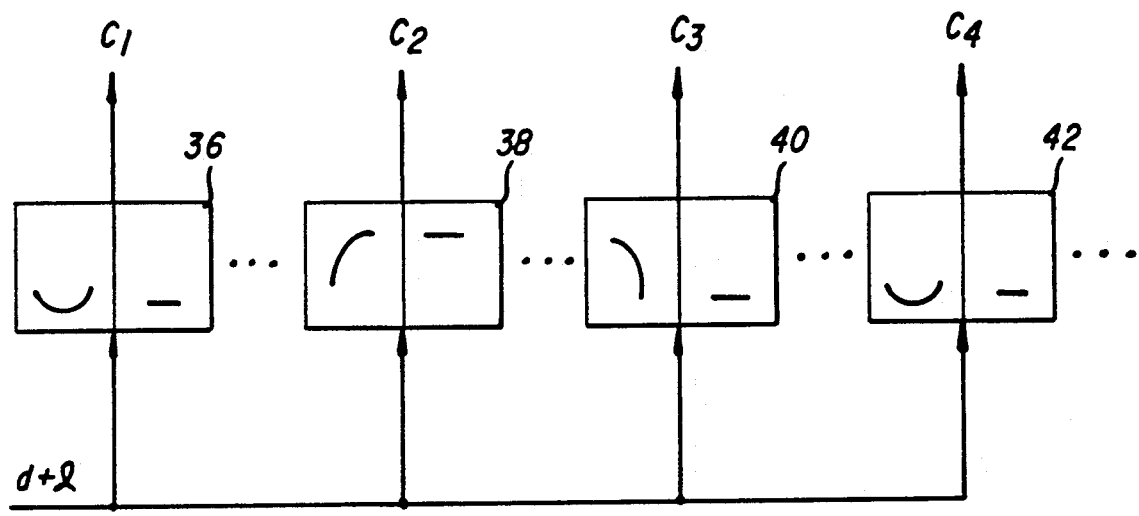
FIG. 4 is a schematic block diagram showing the arrangement of the interpolation coefficient kernel memory.

A value at any location between original sample points B and C can be computed in this manner. To avoid the necessity of calculating the values of the interpolation coefficients each time an interpolated value is produced, the coefficient values are calculated from the piecewise cubic polynomials defining the kernel, and stored in the lookup table 16 (see FIG. 1). In a preferred mode of practicing the invention, two interpolation kernels are provided, one for cubic convolution (preferred for continuous tone images) and one for replication (preferred for alphanumeric data). The kernels are each evaluated at 1,024 points to 16-bit accuracy. The resulting 1,024 coefficients are divided into four groups, representing the four segments of the kernel between $(-2,-1)$, $(-1,0)$, $(0,1)$, and $(1,2)$, each group having 256 coefficients. The four groups are stored in four banks of memory which can be simultaneously addressed by a displacement value d that represents the distance from the zero at $-1$ in the kernel to the sample B. Each bank of memory contains the groups of coefficients for the different interpolation kernels successively, so that in addition to addressing the specific set of coefficients with displacement d, an additional offset 1 can be added to address other interpolation kernels. The offset 1 is a multiple of 256. The arrangement of the interpolation kernel lookup tables is shown in FIG. 4, where the first memory bank 36 contains the successive groups of 256 coefficients each that define the kernels on the interval $(-2,-1)$. The groups are shown graphically in the Figure. Similarly the second memory bank 38 contains the groups of coefficients representing the portions of the convolution kernels from $(-1,0)$, and so on for memory banks 40 and 42. As shown in FIG. 4, a displacement value $d+1$ is simultaneously applied to all four memory banks to produce coefficients $C_1$, $C_2$, $C_3$, and $C_4$.

Figure 5:
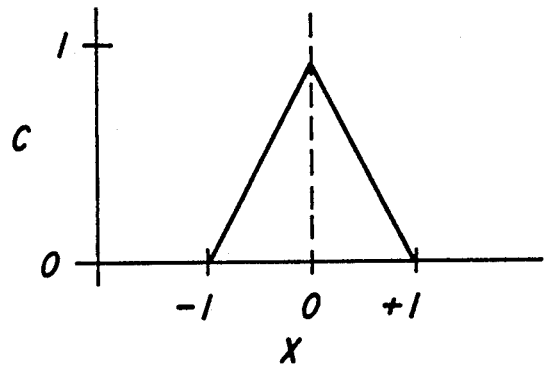
FIG. 5 is a graph illustrating a linear interpolation kernel.
Figure 6:
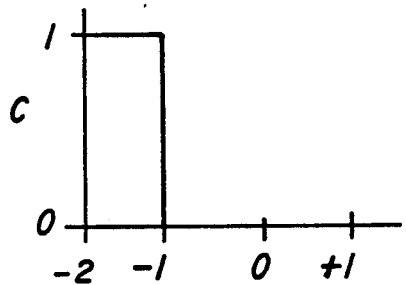
FIG. 6 is a graph illustrating a replication interpolation kernel.

The interpolation lookup table may also contain a kernel for linear interpolation. A kernel for linear interpolation is shown in FIG. 5, and is graphically represented as a triangular waveform in the interval $(-1,1)$ and zero elsewhere. The kernel for interpolation by replication is shown in FIG. 6 and is graphically represented as a step function having a value of one in the interval $(-2, -1)$ and zero elsewhere.

Returning now to FIG. 1, the interpolation kernel selector 15 operates by examining the input data P to the row interpolator, and the input data P' to the column interpolator and selecting the appropriate interpolation kernel to maximize the appearance of the final interpolated image data P''. As noted above, a preferred interpolation kernel for continuous tone images is cubic convolution, and a preferred interpolation kernel for alphanumeric text is replication. Since continuous tone images are characterized by smoothly changing density levels, and alphanumeric text is characterized by abrupt transitions from black to white, the interpolation kernel selector 15 operates by examining the difference between successive signal values (P or P'), and employing cubic convolution when the differences are below a predetermined threshold, and replication when the differences exceed the predetermined threshold.

The threshold can be determined either empirically by producing images having text and continuous tone content and observing the results produced employing different thresholds, or by calculating the desired threshold from first principles, taking into account the effect on signal band width (in the spatial frequency domain) or on absolute interpolation error (in the space domain). In either event, useful results have been achieved by setting the threshold equal to about 3,000 counts out of a possible 4,096 maximum, for a 12 bit signal. This threshold produced images having pleasingly rendered continuous tone portions and sharp clear text.

The sampling increment h is determined by the logic and control unit 10 by first determining a magnification factor M defined as the lesser of the two ratios $x'/x$, $y'/y$, where x is the number of pixels in the original image in the horizontal direction, and $x'$ is the number of pixels available on the output printer for printing the original image. The number of available pixels on the output medium is determined by the output format including the width of the output medium and the number of input images to be printed across the page in the output image. Similarly, y represents the number of pixels in an input image in the vertical direction and $y'$ represents the number of pixels available to print the image in the vertical direction. The lesser of the two ratios is chosen so that the reproduced image will not be cropped. The sampling increment h is then determined by:

$$h = 256/M \qquad (4)$$

where the 256 in the numerator comes from the fact that each interpolation kernel has been sampled 256 times between each interpolation node. The sampling increment h is computed to an accuracy of 24 bits. Ignoring the decimal place, values of h between zero and 256 represent magnification, and values between 256 and 4095 represent reduction.

Figure 7:
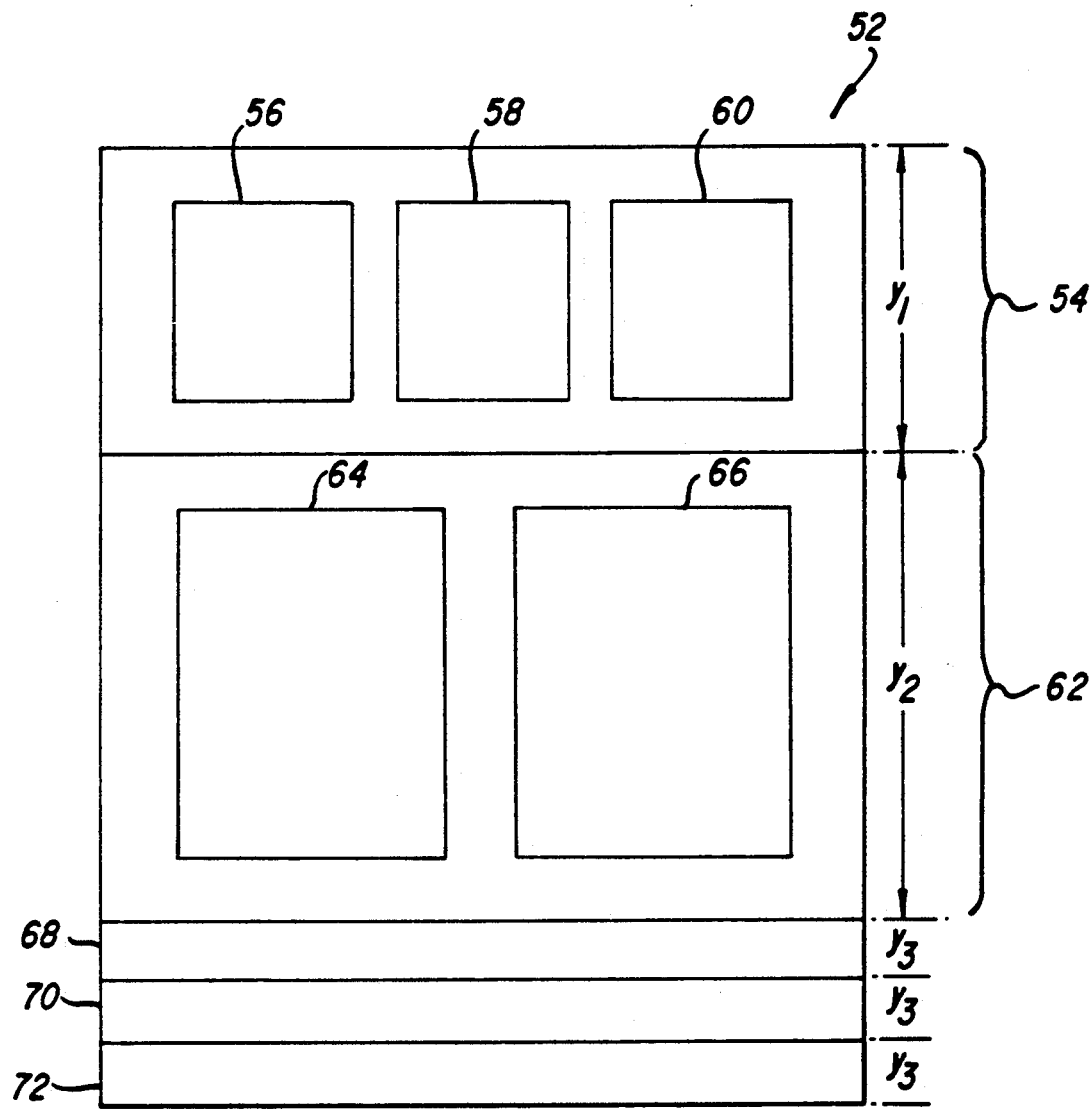
FIG. 7 is a diagram illustrating the layout of one example of an output image.

In a preferred embodiment, the output image format is selectable by the user, and comprises one or more bands. There are two types of bands, image and text. Each text band is specified by the height of the band in pixels and the number of character images in the band, and each image band is specified by the height of the band in pixels and the number of images in the band. The images may also contain text in the form of annotations that have been made to the images, such as numbering parts in the image. Minimum borders and separation between the images horizontally and vertically are determined automatically by the LCU 10. An example of an output format is shown in FIG. 7. The output image 52 includes a first band 54 $y_1$ pixels high, having 3 images 56, 58, and 60, a second band 62, $y_2$ pixels high having 2 images 64 and 66, and three text bands 68, 70, and 72, each $y_3$ pixels high.

Figure 8:
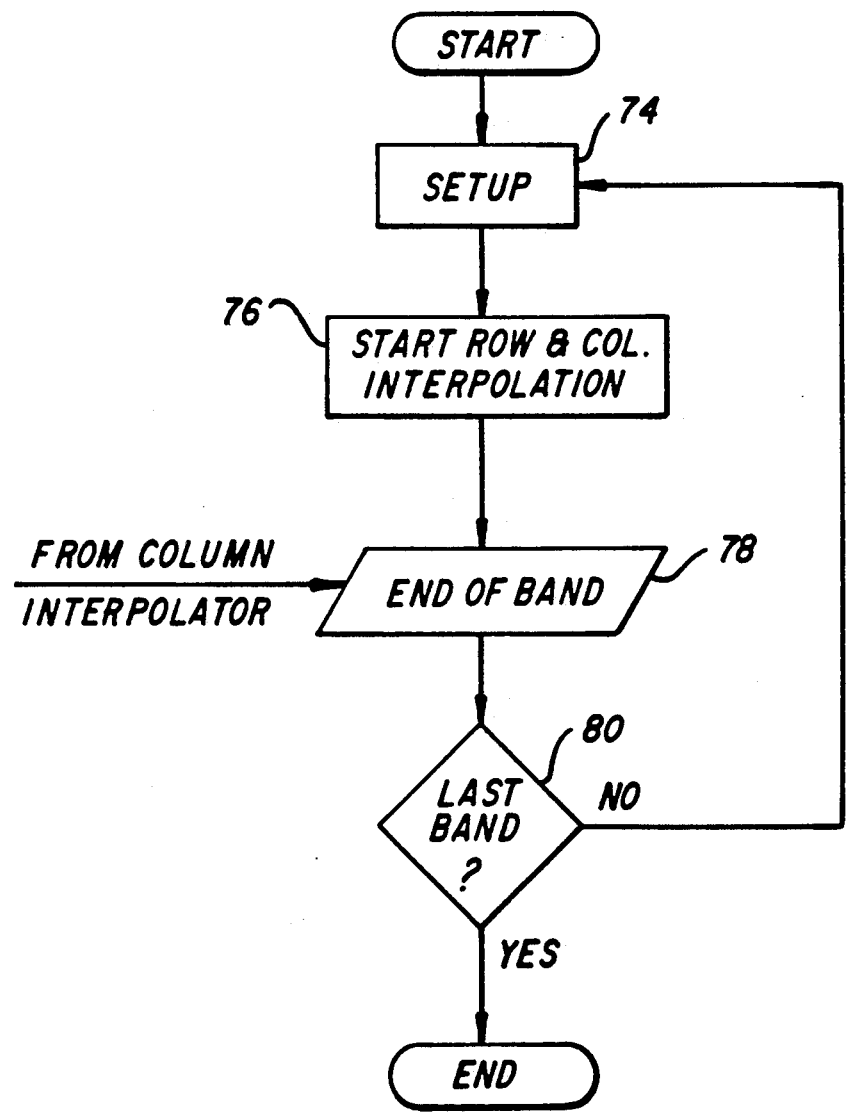
FIG. 8 is a flow chart illustrating the overall control of the interpolator shown in FIG. 1.

The overall control provided by the logic and control unit is shown in FIG. 8. The LCU 10 first performs a setup (74) calculating the sampling increments $h_H$, $h_v$ as described above. It is possible that the sampling increments are not identical due to the fact that the individual pixels may not have the same horizontal and vertical dimensions. The LCU sends the band parameters for the first band, including the sampling increments $h_H$ and $h_v$, number of lines in the band, number of images in the band, and number of input and output pixels per image to the row and column interpolators. Next, the LCU signals the row and column interpolators 12 and 14 to start interpolating (76). When an end of band signal is received (78) from the column interpolator 14, the LCU checks to see if the last band in the image has been interpolated (80). If not, a setup is performed for the next band by returning to function 74 and the process is repeated. If the last band is completed, the process is ended. The band parameters are double buffered so that the interpolation can employ one set of parameters while the next set is being loaded.

Figure 9:
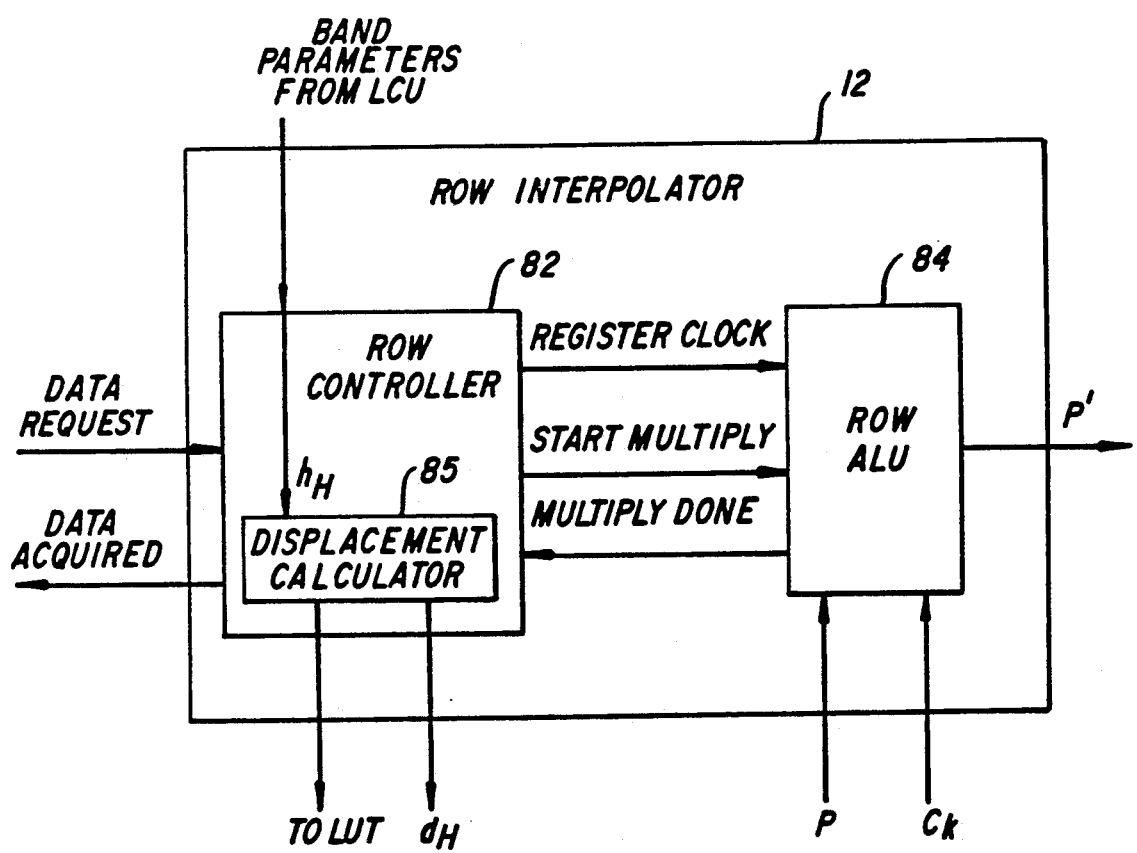
FIG. 9 is a block diagram showing the row interpolator in further detail.

The row interpolator 12 will now be described in more detail with reference to FIG. 9. The row interpolator 12 includes a row controller 82 and a row arithmetic and logic unit (ALU) 84. The row controller receives the band parameters from the LCU 10 and controls the row ALU 84. The row controller 82 includes a displacement calculator 85 that generates the displacement address $d_H$ that is an increasing multiple of the sampling increment $h_H$ across an input image, and sends the displacement address $d_H$ to the interpolation kernel selector 15. The interpolation kernel selector 15, which also receives the input data P, computes the successive differences between data values, and based on the magnitude of the difference adds an offset 1 to the value d to determine which of the interpolation kernels are selected. The interpolation kernel selector 15 sends the value $d+1$ to the interpolation kernel lookup table 16 to retrieve the interpolation coefficients. The row controller retrieves original image pixel values from the frame store and orders the row ALU 84 to perform interpolation calculations to produce interpolated pixel values P' and supplies the interpolated pixel values P' to the column interpolator in response to a data request. The row ALU 84 receives the original values P from the frame store and the interpolation coefficients $C_k$ from the lookup table 16 and in response to a command to start from the row controller 82, calculates an interpolated value P'.

Figure 10:
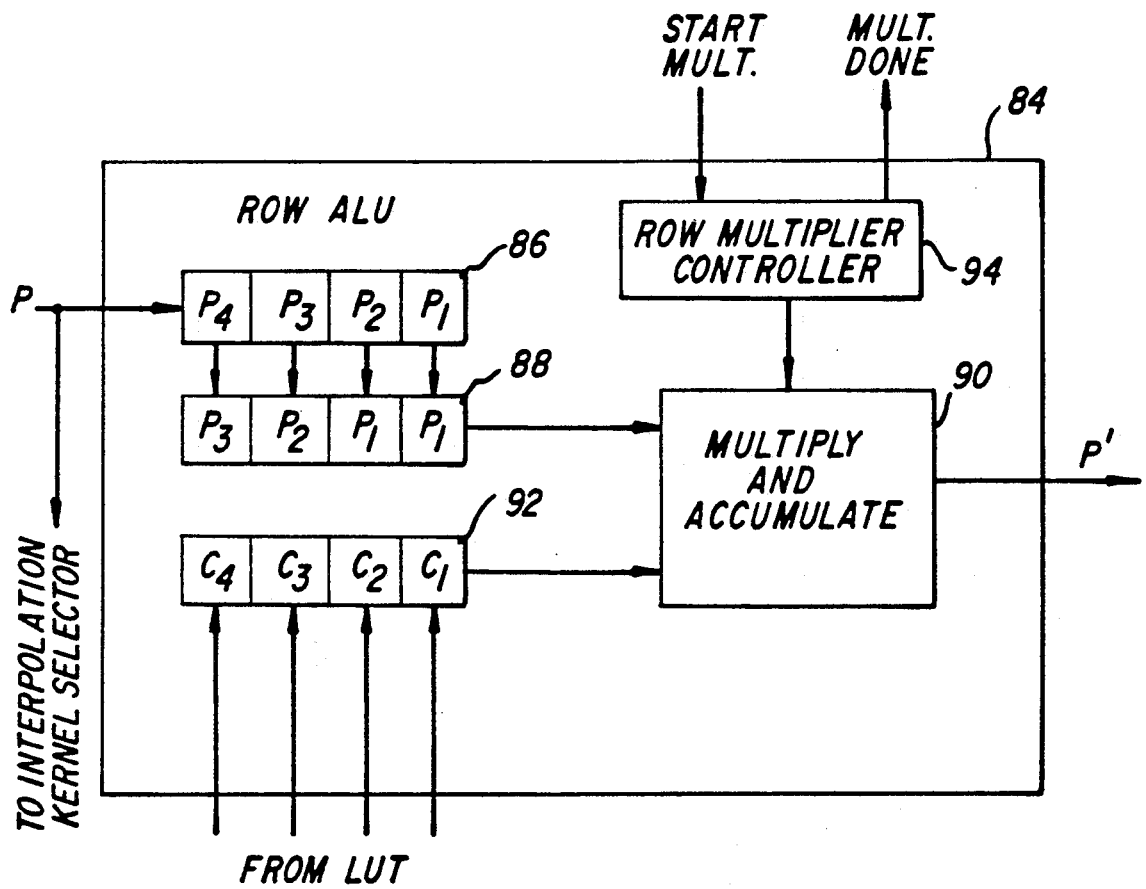
FIG. 10 is a block diagram showing the row ALU in further detail.

The row ALU 84, which is shown in more detail in FIG. 10 includes an input register 86 that receives and temporarily holds pixel values from the frame store. The pixel values are also sent to the interpolation kernel selector 15 as noted previously. The pixel values are transferred in parallel from input register 86 to a working register 88, from which they can be shifted sequentially to a multiply/accumulate module 90. The four interpolation coefficients $C_1-C_4$ from the lookup table 16 are entered in parallel into a coefficient register 92 from which they are shifted in sequence to the multiply/accumulate module 90. A row multiplier controller 94 is slaved to the row controller 82, and upon receipt of a start multiply signal from the row controller 82, signals the multiply/accumulate module 90 to perform the multiply and accumulate operations on the data in registers 88 and 92 to compute an interpolated pixel value P' as follows:

$$P' = (C_1 \times P_1) + (C_2 \times P_2) + (C_3 \times P_3) + (C_4 \times P_4). \quad (5)$$

Figure 11:
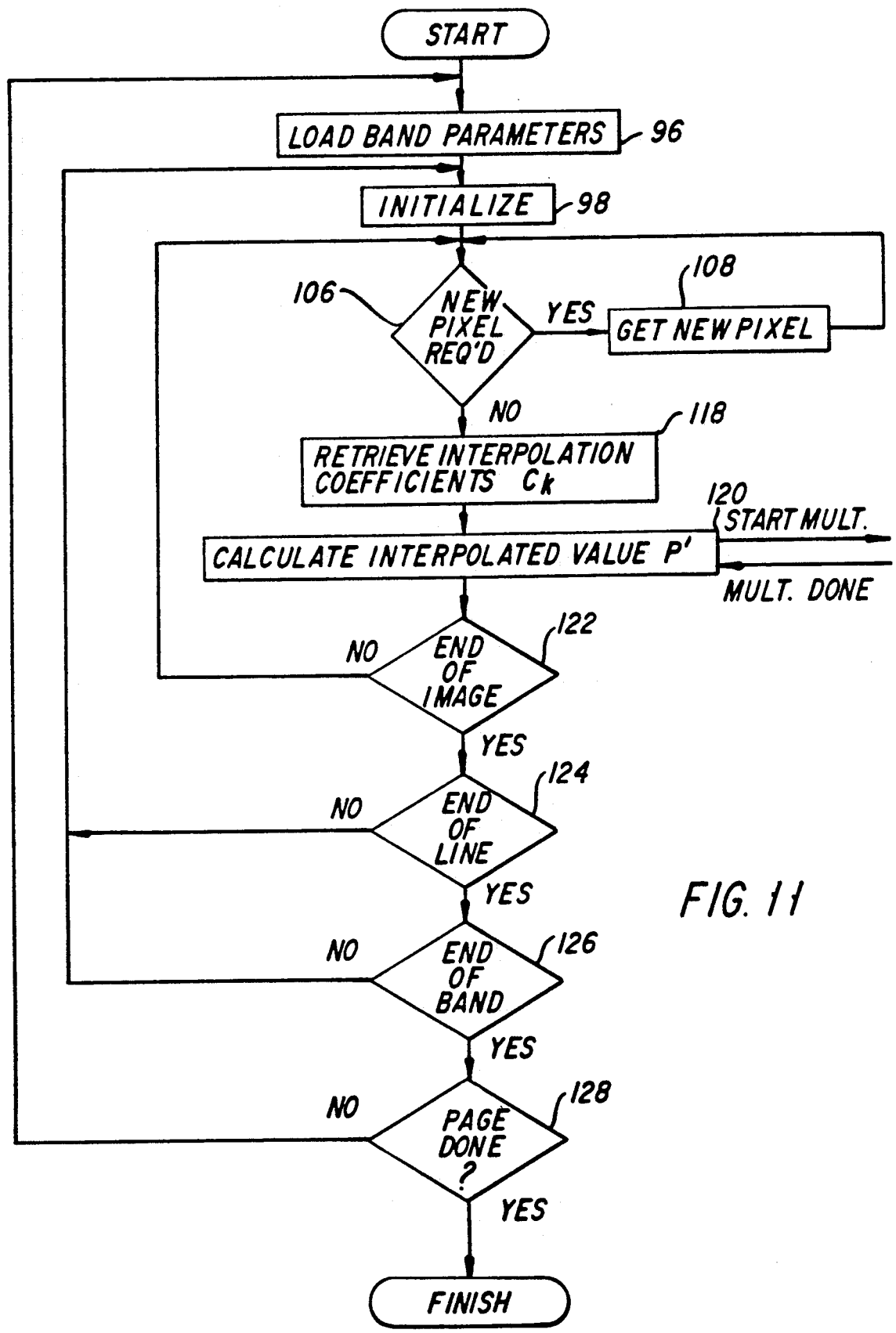
FIG. 11 is a flow chart showing the operation of the row controller.
Figure 12:
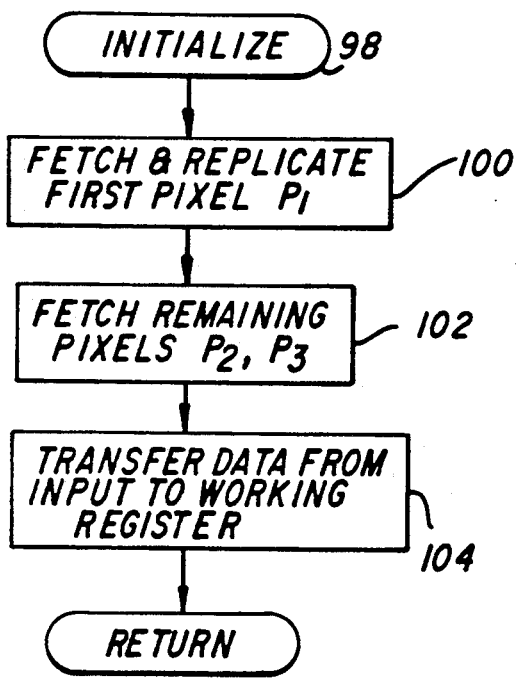
FIG. 12 is a flow chart showing the initialization function performed by the row controller.

The operation of the row controller is shown in FIG. 11. On command from the LCU 10, the row controller loads the band parameters (96) including the number of lines in the output band, the sampling increment $h_H$, the number of images in the band, and the number of horizontal pixels in the images. Next, the row controller initializes (98) the row ALU 86 by sending pixel addresses to the frame store memory. The pixels are sent from the frame store to the input register 86 in the row ALU 84. The initialization step 98 is shown in FIG. 12. To provide the interpolator with sufficient information so that interpolation can be performed between the first two pixels in a row, the first pixel $P_1$ in the row is loaded twice (100) as shown in register 88 in FIG. 10. The next two pixels in the row $P_2$ and $P_3$, are retrieved (102) from the frame store and loaded in the input register 86 of the ALU 84. Finally, the row controller 82 sends a register clock signal (104) to transfer the pixel data from the input register 86 to the working register 88 in the row ALU.

Figure 13:
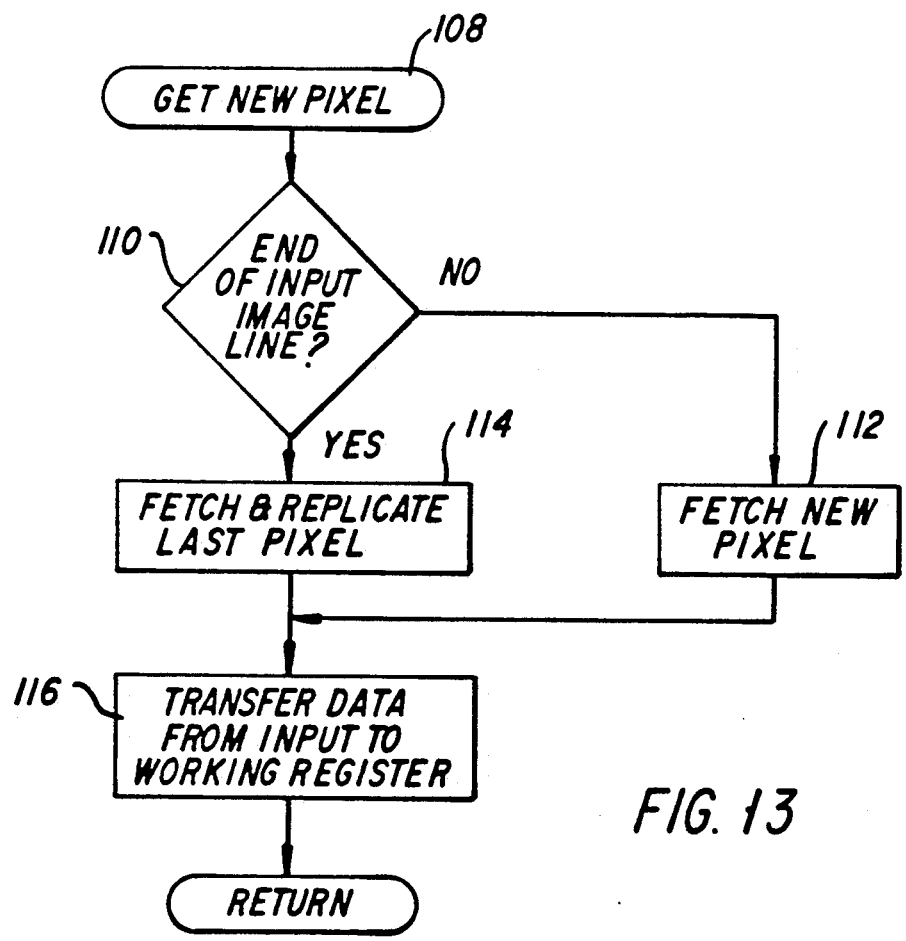
FIG. 13 is a flow chart showing the "get new pixel" function performed by the row controller.

Returning to FIG. 11, the row controller checks to see if a new pixel is required (106). If a new pixel is required, the row controller gets a new pixel (108) from the frame store as shown in FIG. 13. First a check is made (110) to determine if the end of a row in an image has been reached. If not, the next pixel in the row is fetched (112) from the frame store. If the end of the row in the image has been reached, in order to provide data for the interpolator, the last pixel in the row is replicated (114). The step of replicating the last pixel in the row can occur twice in succession until the interpolation kernel is centered on the last pixel in the row. Then the pixel data in input register 86 is transferred to working register 88 (116).

Returning to FIG. 11, when a new pixel is no longer required, the four interpolation coefficients $C_1-C_4$ are ordered from the lookup table 16, by sending a displacement address $d_H$ to the interpolation kernel selector 15 (118). The interpolation kernel selector 15 determines the interpolation kernel to be employed and adds the appropriate offset 1 to the displacement value $d_H$. The sum $d_H+1$ is sent to the interpolation kernel lookup table 16. The interpolation coefficients returned from the LUT 16 $C_1-C_4$ are loaded into the coefficient register 92 in the ALU 84 and the row controller 82 signals the row multiplier controller 94 to calculate an interpolated value P' by sending a start multiply signal. When the multiply accumulate operation is completed, a multiplication done signal is returned from the row multiplier controller 94. Next, the row controller checks for the end of an image (122). This is a check for the end of a line in an image and not for the last line in the image.

If the end of the image has not occurred, the row controller returns to see if a new pixel is required (106). If it is the end of the image, a check is made (124) to see if it is the end of a line (i.e. the end of a row in the last image of the band). If not, the row controller returns to initialize (98) for the next image in the band. If it is the end of the band, a check is made (126) to see if the end of the band has been encountered. If not, the row controller returns to initialize (98) for the next line in the first image in the band. If the end of the band is encountered, a check is made to see if it is the end of the page (128). If not, the row controller loads the band parameters (96) for the next band. If it is the end of the page, the interpolation is finished for that page.

Figure 14:
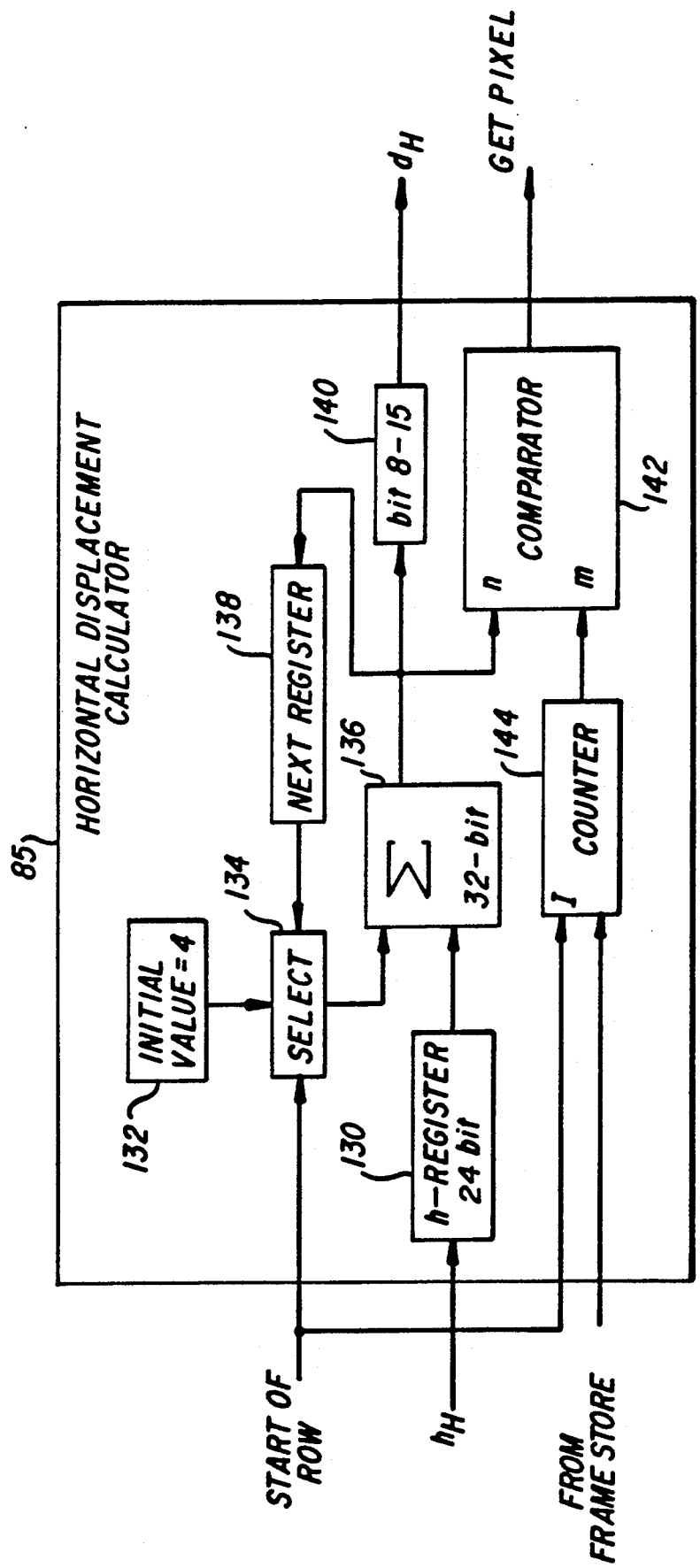
FIG. 14 is a block diagram showing the row displacement calculator in the row controller.

The horizontal displacement calculator 85 that calculates the displacement value $d_H$ for addressing the lookup table 16, and determines when to get another pixel from the frame store will now be described with reference to FIG. 14. At the beginning of a band, the value of the sampling increment $h_H$ is latched into a 24 bit data latch 130, and at the start of each line of each image, an initial value of 4, stored in a latch 132 is selected by a selector 134. The initial value and the value of $h_H$ from register are summed in a summer 136. The sum is stored in a "next register" 138, the contents of which are supplied to the input of the summer 136 on the next and succeeding cycles of the displacement calculator. Bits 8-15 of the sum are extracted 140, and represent the displacement value $d_H$ employed to address the lookup table 16 to retrieve the interpolation coefficients.

It is desirable to provide a nearly continuous magnification factor so that images of any size :an be interpolated to images of any other size. This could be accomplished by sampling the interpolation kernel at very fine increments. However, this would require a large memory for holding the sampled interpolation coefficients. We have discovered that past a certain point, increasing the sampling resolution of the interpolation kernel does not significantly improve the accuracy of the interpolation. Therefore, to provide a nearly continuous range of magnifications, while avoiding a prohibitively large coefficient table, the displacement $h_H$ is calculated to a higher precision than the interpolation kernel is sampled. In the preferred embodiment the displacement $h_H$ is calculated to 16 bit fractional accuracy (e.g. eight bits for the integer portion employed for reduction, and 16 bits for the fractional position = 24 bits) and the kernel is sampled to 8 bit accuracy (e.g. corresponding to 256 samples between interpolation nodes).

The address for the interpolation coefficient memory is generated by taking bits 8–15 of the sum accumulated in summer 136. This has the effect of selecting the values of the interpolation kernel at the nearest preceeding sampling location. The resulting interpolation errors are not visible in the output image. The most significant 16 bits of the sum is compared in a comparator 142 with a cumulative count from a counter 144 that is initialized to zero at the start of a row in an image, and is incremented each time a pixel is received from the frame store. As noted previously, the first pixel in a row in an input image is duplicated to provide data for interpolating between the first and second pixels, and the last pixel is duplicated twice when the end of the row is reached. The row controller is requested to get a new pixel until the value n at the comparator 142 is equal to m. Thereafter, each time that n becomes greater than m, a new pixel is ordered. The displacement value $d_H$ is a monotonically increasing multiple of $h_H$'s that increments each time a new interpolated value P' is calculated, and is set to zero at the start of each row of each image.

Figure 15:
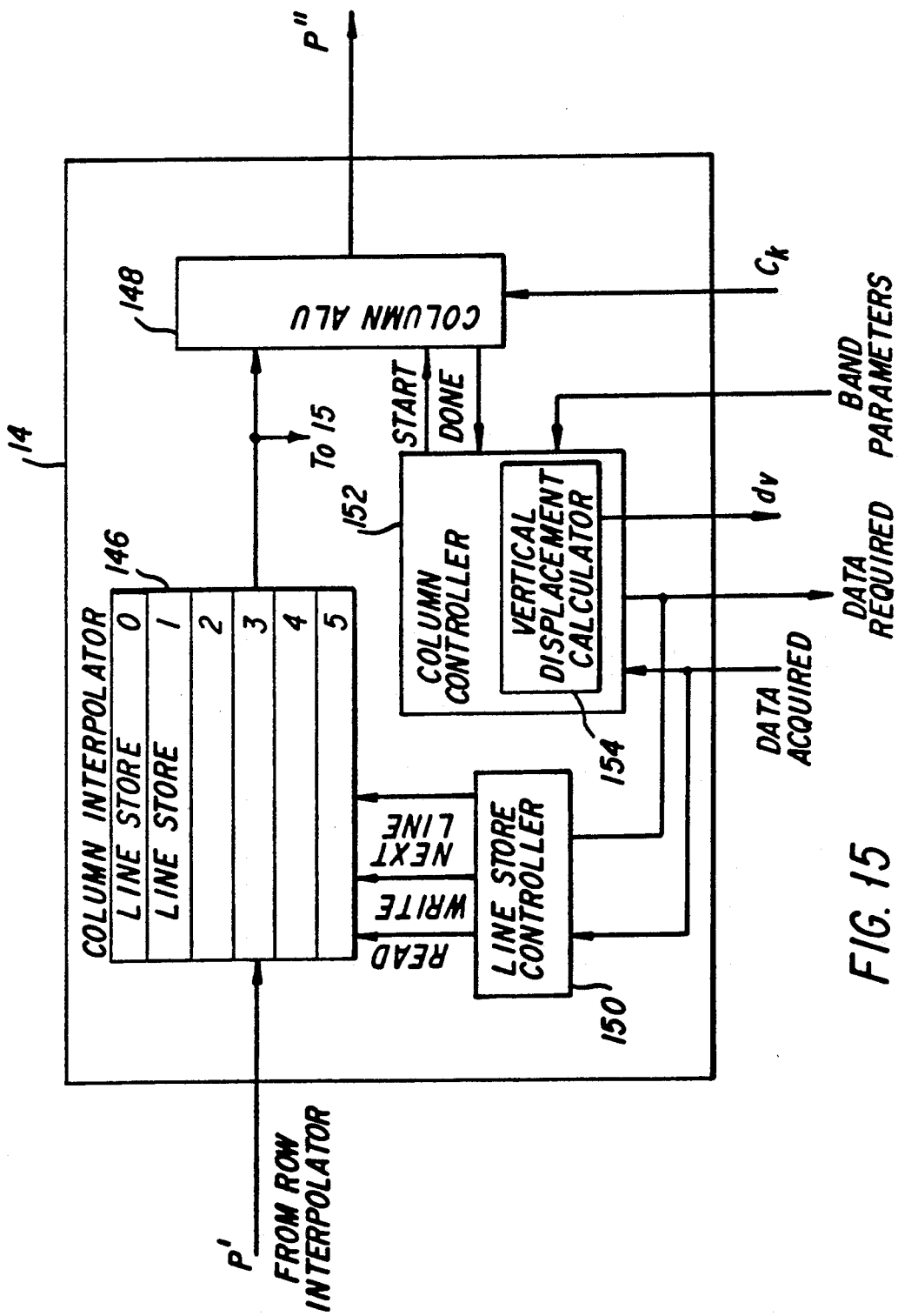
FIG. 15 is a block diagram showing the column interpolator.

The column interpolator 14 will now be described in further detail with reference to FIG. 15. The column interpolator includes six line stores 146 for receiving interpolated row data P'; from the row interpolator, and supplying the row interpolated data four column wise samples in succession to a column ALU 148. The column ALU 148 receives the four interpolated data values P' from the line store 146, and 4 interpolation coefficients $C_k$ from the lookup table 16 and performs multiply and accumulate operations similar to those performed by the row ALU 84 described previously, to produce a new interpolated value P'' between rows. The values P'' produced by the column ALU 148 are sent to the output buffer 18 (see FIG. 1). The loading of data into the line stores 146 from the row interpolator, and supplying data from them to the column ALU 148 is controlled by a line store controller 150. Overall control of the column interpolator 14 is provided by a column controller 152. The column controller 152 requests interpolated data from the row interpolator and includes a vertical displacement calculator 154 for calculating the displacement values $d_v$ that are employed by the interpolation kernel selector 15 to address the lookup table 16. The column controller 152 also signals the column ALU 148 when to start computing an interpolated value.

Figure 16:
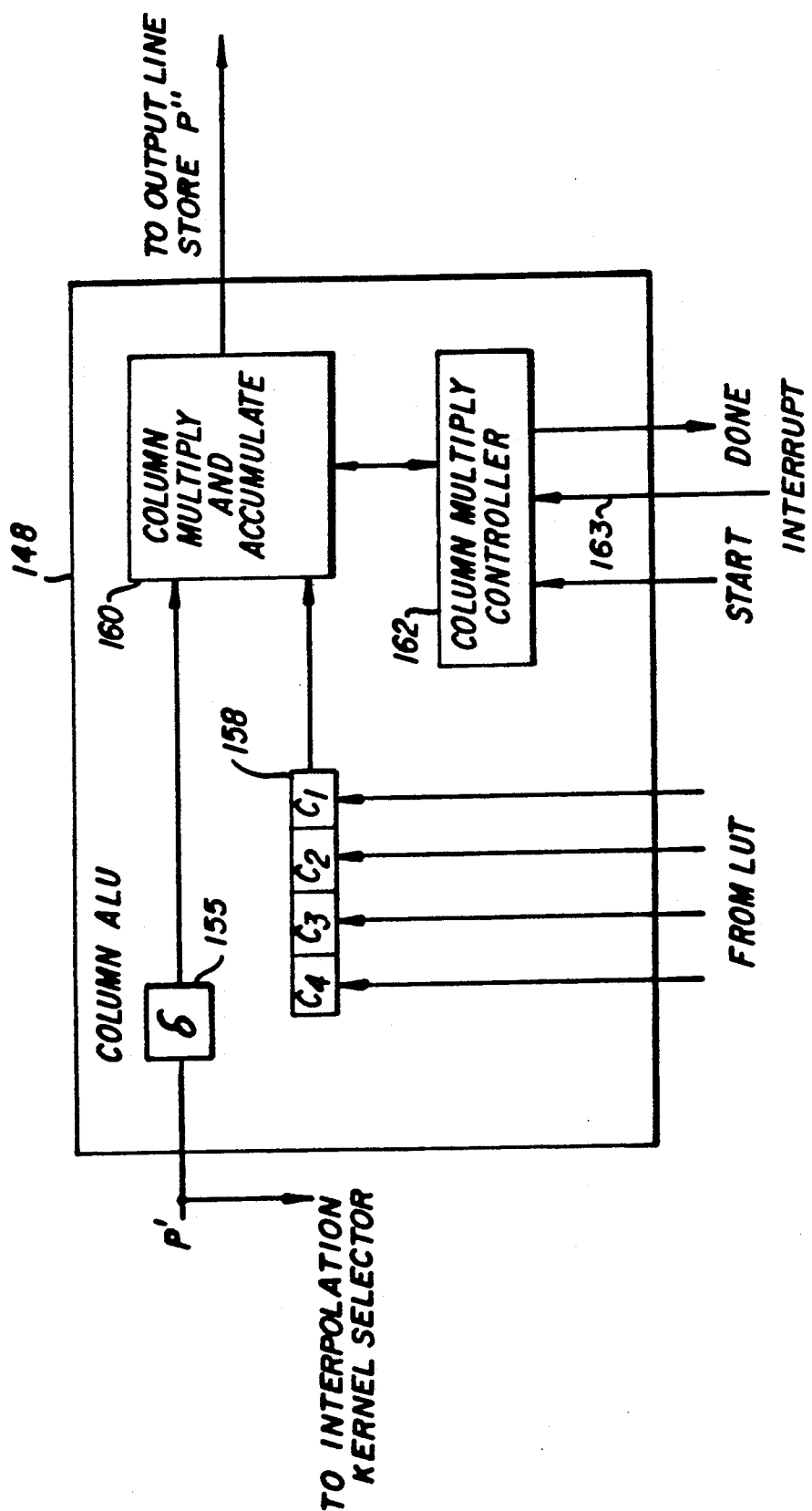
FIG. 16 is a block diagram showing the column ALU.

The structure of the column ALU 148 is shown in more detail in FIG. 16. The column ALU 148 receives interpolated row data directly from the line stores 146. Each four successive interpolated samples are from corresponding row locations in four succeeding rows of an image. A coefficient register 158 receives four corresponding interpolation coefficients $C_1$–$C_4$ from the lookup table 16. A multiply and accumulate module 160 receives the interpolated pixel values P' and coefficients $C_k$ and performs the multiplication and summation to produce the interpolated values P'' that are supplied to the output buffer 18. A column multiply controller 162 is slaved to the column controller 154, and upon receipt of a start signal from the column controller 154 causes the column multiply and accumulate module 160 to perform the computation of the interpolated value P''. The column multiply controller 162 also includes an interrupt input 163 from the interpolation kernel selector 15. The interpolation kernel selector 15 receives the values P' from the line stores, and compares the magnitudes of the differences between the two center values in successive groups of four values, with the predetermined threshold to determine whether the interpolation kernel should be changed. Whenever it is determined that the kernel should be changed, the interpolation kernel selector interrupts the column multiply controller 162 to stop the calculation of the interpolated values while the address to the lookup table is changed, and a new set of coefficients is latched into coefficient register 158. One sample delay 155 is provided in the column ALU 148 to give the interpolation kernel selector a chance to examine the input data stream one sample ahead. When the new coefficients are loaded in register 158, the interrupt is removed, and the column multiplier controller 162 continues to perform the interpolation by the values between the rows. When the computation is complete, the column controller 162 returns a "done" message to the column controller 152.

Control of the line stores 146 will now be described in further detail with reference to FIGS. 17 and 18. Interpolated data from the row interpolator is directed to any one of the six line stores 146 numbered 0 through 5 by applying a write signal to the line store while data is applied to the inputs of all the line stores simultaneously. Each of the line stores is a first in first out line memory that is capable of storing up to 4096 interpolated values of 17 bits each. The outputs from the line stores are selected one at a time by tri-state buffers 176 and supplied to the column ALU 148.

Figures 17, 18:
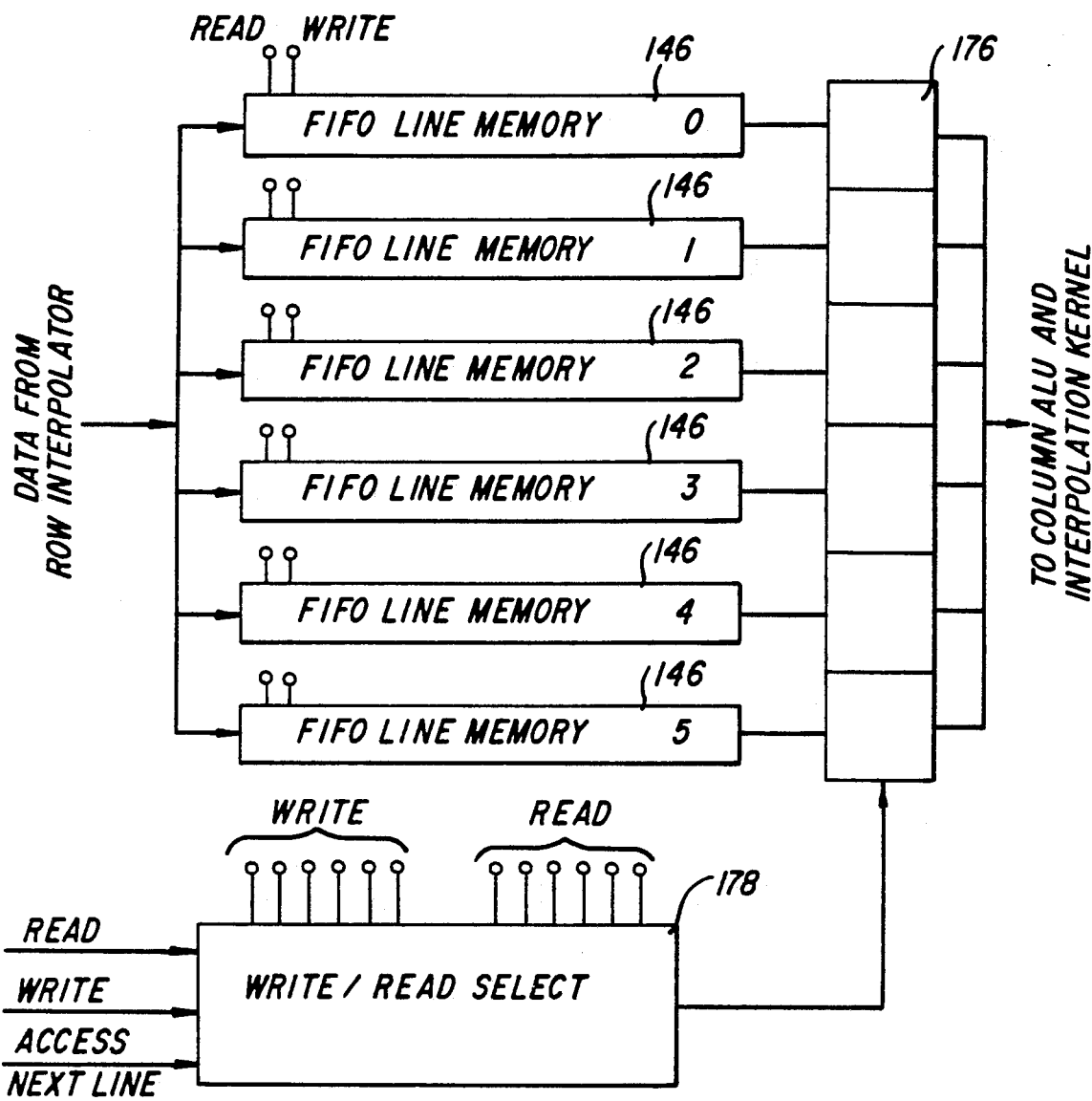
FIG. 17 is a block diagram showing the organization of the line stores in the column interpolator.
FIG. 18 is a table useful in describing the operation of the read/write select module associated with the line stores shown in FIG. 17.

The tri-state buffers 176 are controlled by a read/write select module 178 that applies the outputs of the line stores according to the output line selection table shown in FIG. 18. The output is sent to the column ALU 148 and the interpolation kernel selector 15 as described above. Read and write signals are applied to the line stores by the read/write select module according to the selection table shown in FIG. 18. Thus, while data is being written into line store 5, data is being sequentially read out of line stores 0, 1, 2, 3, and 4. When a signal is received from the line store controller 150 to access the next line, the read/write select module 178 advances to the next row in the table shown in FIG. 18, and controls the line stores accordingly.

Figure 19:
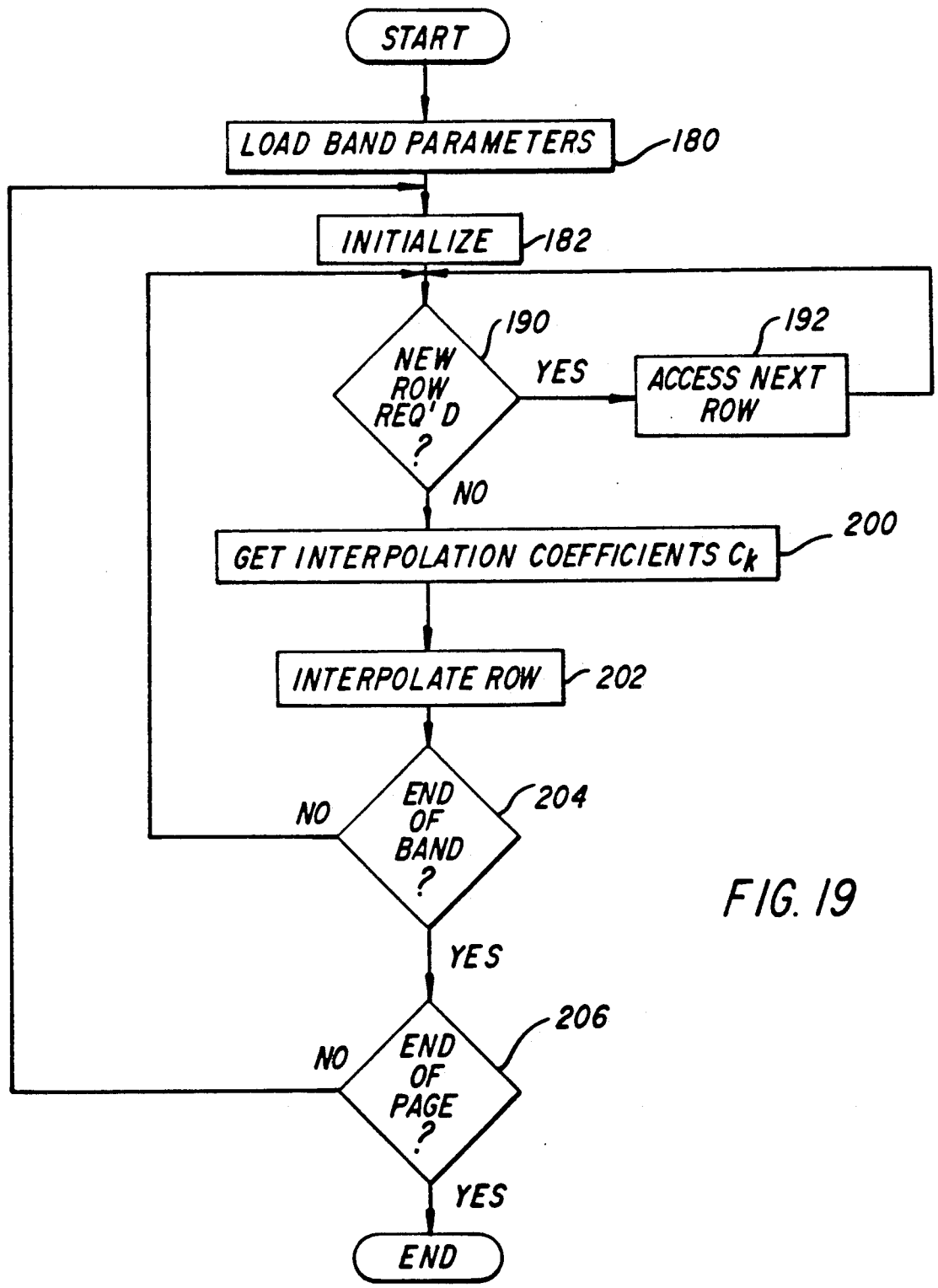
FIG. 19 is a flow chart showing the operation of the column controller.

The operation of the column controller 152 is shown in FIG. 19. First the column controller loads the band parameters (180) from the LCU 10, including the vertical output sampling increment $h_v$, the number of lines per band, the number of images per band, and the number of lines in the original image. Next, the column controller initializes (182) the data in the line stores by ordering the row interpolator 12 to perform row interpolation until 3 rows of interpolated data are read into line stores 0, 1, and 2. Similar to the initializing procedure performed for the row interpolator 12, the column interpolator duplicates the first row of data in an image so that rows of interpolated data between the first and second rows may be obtained. To accomplish this, the read/write select 178 addresses the tri-state buffers 176 for line 0 twice for the first pixel in each column of data. After the line stores are initialized (182) a check is made (190) to see if a new row of interpolated data is required. If so, the next row is accessed (192) by applying a signal to the read/write select module 178 that causes it to advance to the next configuration shown in FIG. 18, and a new row of interpolated data is ordered from the row interpolator 12.

Figure 20:
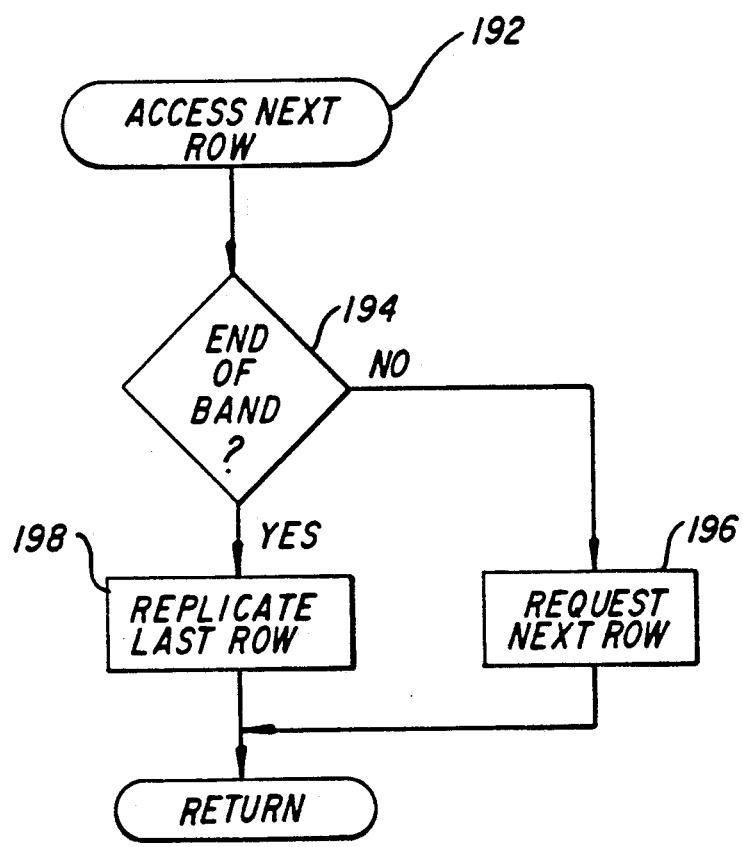
FIG. 20 is a flow chart showing the "access next row" function performed by the column interpolator.

At the end of a band, the column interpolator 14 replicates the last line, up to 2 times as required to provide data to interpolate up to the last line of data values. This is accomplished as shown in FIG. 20. When the next row is accessed (192) a check is made 194 to see if this row being requested is the last one in the band. If not, the next row is requested normally (196) from the row interpolator 12. If this is the last row in the band, the last row is replicated up to 2 times (198) to provide interpolation data.

Returning to FIG. 19, if a new row of data is not required (190) the column controller computes the displacement address $d_v$ and sends the address to the lookup table 16 to return the interpolation coefficients $C_1$-$C_4$ (200). The column interpolator then interpolates a row of data (202) by successively sending four column wise data values from the four consecutive lines to the column ALU 148, and requesting the column ALU to compute the interpolated value P''. At the end of the row, a check is made (204) to see if it is the end of the band. If not, control returns to see if a new row is required (190), and the cycle repeats. If it is the end of a band, a check is made 206 to see if it is the end of the page. If the page is not done, control is returned to execute the next set of band parameters (180) for the next band. The band parameters are double buffered so that the interpolator can employ one set of parameters while the next set is being loaded.

Figure 21:
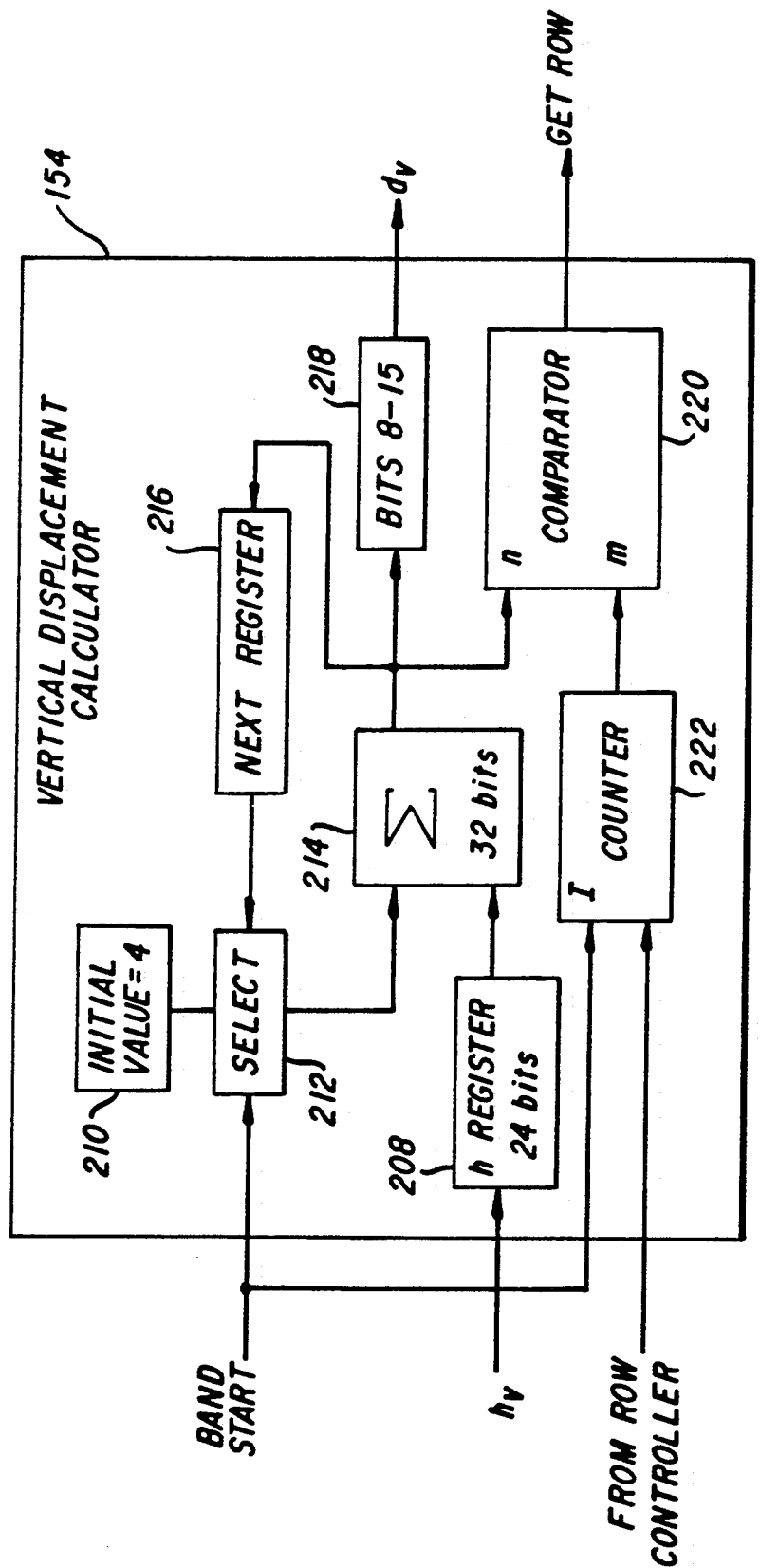
FIG. 21 is a block diagram showing the column displacement calculator portion of the column controller.

The vertical displacement calculator 154 which computes the displacement address $d_v$ for retrieving interpolation coefficients from lookup table 16, and determining when a new line of interpolated data is required from the row interpolator 12, is shown in FIG. 21. The logic of the vertical displacement calculator 154 is identical to the logic of the row displacement calculator 85 described above.

At the beginning of a band, the sampling increment $h_v$ is latched into a 24 bit data latch 208, and an initial value of four stored in a latch 210 is selected by selector 212. The initial value and the value of $h_v$ are summed by a summer 214. The sum is stored in a "next value" register 216, the contents of which are supplied to the summer 214 on the next and succeeding cycles to the end of the band. Bits 8-15 of the sum are extracted 218 and represent the displacement address $d_v$ that is applied to the lookup table 16 to retrieve the four interpolation coefficients $C_1$-$C_4$. The most significant 16 bits of the sum from summer 214 are applied to one input n of a comparator 220, and are compared with an accumulative count m from a counter 222 that is initialized to zero at the start of each band, and is incremented each time a new row of interpolated data is received from the row interpolator 12. As noted previously, the first row in a band is replicated to provide data for interpolating vertically between the first and second row of pixel data, and the last row of interpolated pixel values is replicated up to two times when the end of the band is reached. The column interpolator requests the row controller to supply a new row of pixel data until the value at the n input of comparator 220 equals the value at input m from counter 222. Thereafter, each time that n becomes greater than m, a new row of interpolated pixels is requested from the row interpolator. The displacement address $d_v$ is a running multiple of $h_v$'s that increment each time a new row of values is interpolated, and is reset to zero at the beginning of each band.

Figure 22:
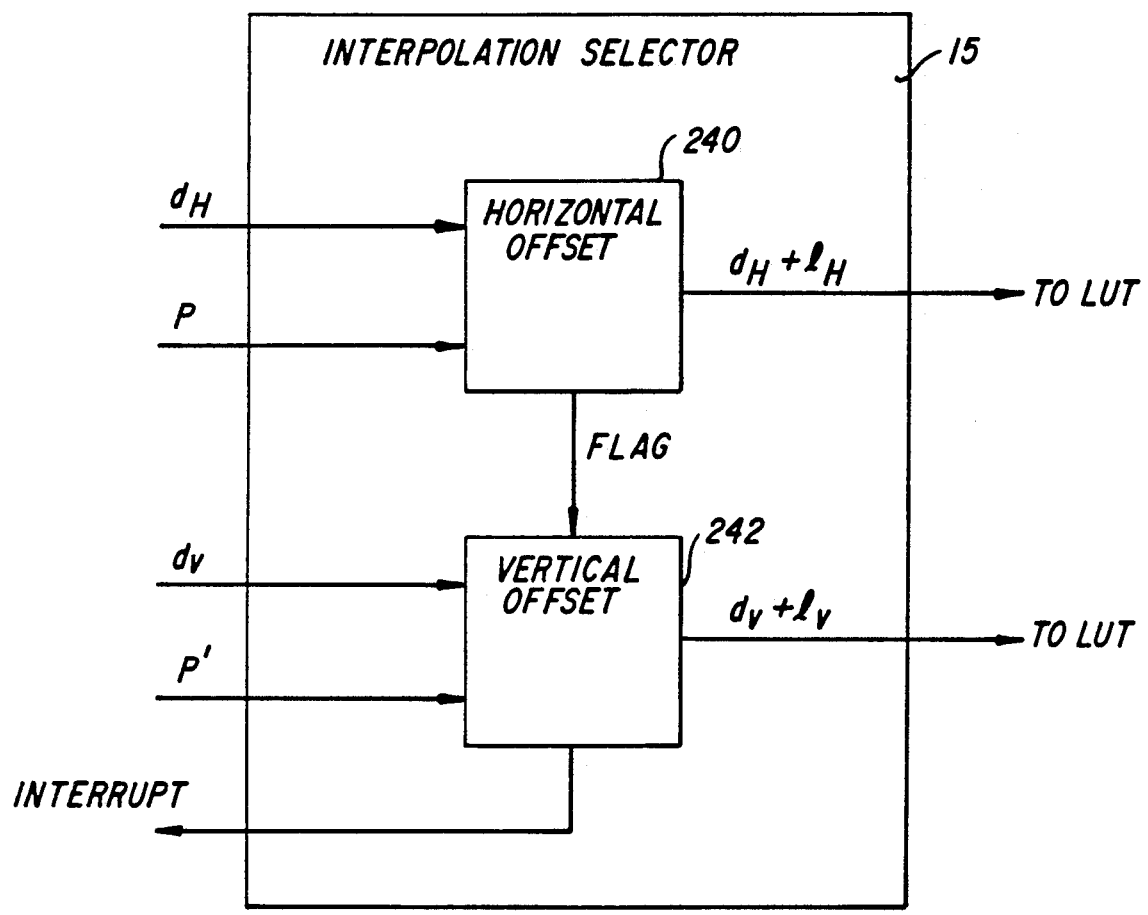
FIG. 22 is a schematic block diagram of the interpolation kernel selector according to the present invention.

The interpolation kernel selector 15 will now be described in further detail with reference to FIG. 22. To avoid instabilities in the output image a change in the interpolation kernel is limited to occur only when a new pixel is ordered for the interpolation calculation. Also, once an interpolation kernel is selected for use, the interpolation kernel selector 15 insures that the kernel remains in use for at least the number of pixels in the kernel (e.g. 4 pixels in the preferred embodiment). This insures that the selected kernel acts on both sides of any abrupt transition in the input data. This is particularly important for the replication kernel. As shown in FIG. 22, the interpolation kernel selector 15 comprises a horizontal offset block 240 and a vertical offset block 242.

The horizontal offset block 240 receives the input pixel values P and the horizontal kernel displacement $d_H$ and generates a lookup table address $d_H+1_H$ to retrieve the appropriate interpolation kernel coefficients. The horizontal offset block also outputs a flag value used internally and by the vertical offset block as described below.

Figure 23:
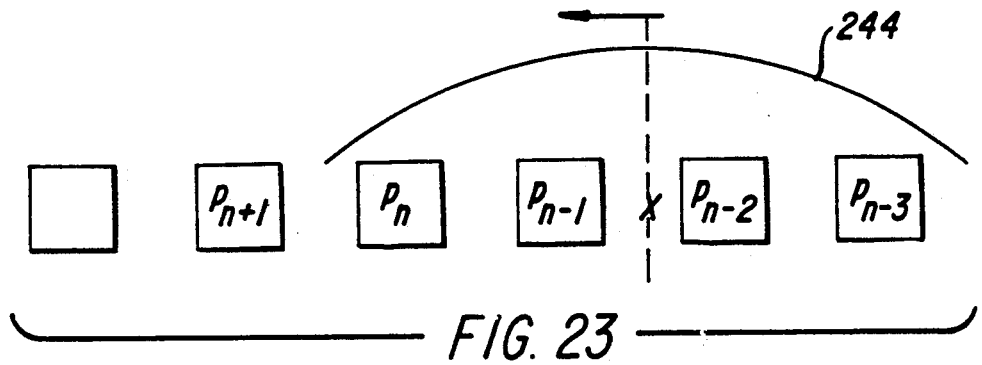
FIG. 23 is an illustration useful in describing the operation of the horizontal offset block in the interpolation kernel selector.

The vertical offset block 242 receives the same interpolated pixel values P' that are sent to the column ALU 148 (see FIG. 16), the vertical displacement $d_v$ for retrieving the interpolation coefficients, and the flag values from the horizontal offset block 240; and produces the addresses for the interpolation kernel lookup tables $d_v+1_v$, and an interrupt signal that is sent to the column controller 162 in the column ALU 148 to stop the column multiplier and accumulator while new coefficients are obtained. This occurs each time the interpolation kernel is changed during interpolation of a row in the column interpolator, The operation of the horizontal offset block 240 will now be described in further detail with reference to FIGS. 23 and 24. FIG. 23 is an illustration showing a series of pixels in a row that are being interpolated. The interpolation kernel 244, shown schematically, is presently employing pixels $P_n$ to $P_{n-3}$ to interpolate a value at a location indicated by X. The next pixel to be called for by the row interpolator will be $P_{n+1}$.

The horizontal offset block 240 obeys the following rules in selecting the interpolation kernel when pixel $P_{n+1}$ is sent to the interpolator:

Rule 1. If $\uparrow \Delta P \uparrow > T$ switch to the replication kernel; if $\uparrow \Delta P \uparrow \leq I$ switch to the cubic convolution kernel, where $\Delta P = P_n - P_{n+1}$, and T is a predetermined threshold, say 3,000 out of a possible 4,096; and Rule 2. When a switch is made from one kernel to another, stay in the new kernel for at least four pixels.

Experimentation has shown that with the above two rules, an unpleasing effect is sometimes created in text or other places in an image where replication is more desirable regardless of the values of neighboring pixels.

The effect results from changing interpolation kernels at different places along a character boundary. This effect is eliminated by employing a third rule, which is:

Rule 3A. If replication was used on pixel $P_{no}$, $P_{mo}$ or $P_{m+1}$, $P_{m+2}$ and $P_{n+1} > H_t$ where $n_i, g_i$ are row and column indices respectively and $H_T$ is a predetermined value (say 4095 for 12 bit signal) that is characteristic of the type of image data to be replicated (i.e. test), use replication for $P_{n+1}$ regardless of Rule 1.

Rule 3 introduces hysteresis so that when the edge of a character in text is encountered, the replication kernel will be employed throughout the character and along character boundaries, even though the value of $\uparrow \Delta P \uparrow$ would suggest a kernel change. This is assuming that the characters are produced at the pixel value $\geq H_T$ (i.e. white on a black background). For characters of opposite polarity (i.e. black on a white background) the threshold is revised and a check is made for $P_{n-1} < H_T$.

Figure 24:
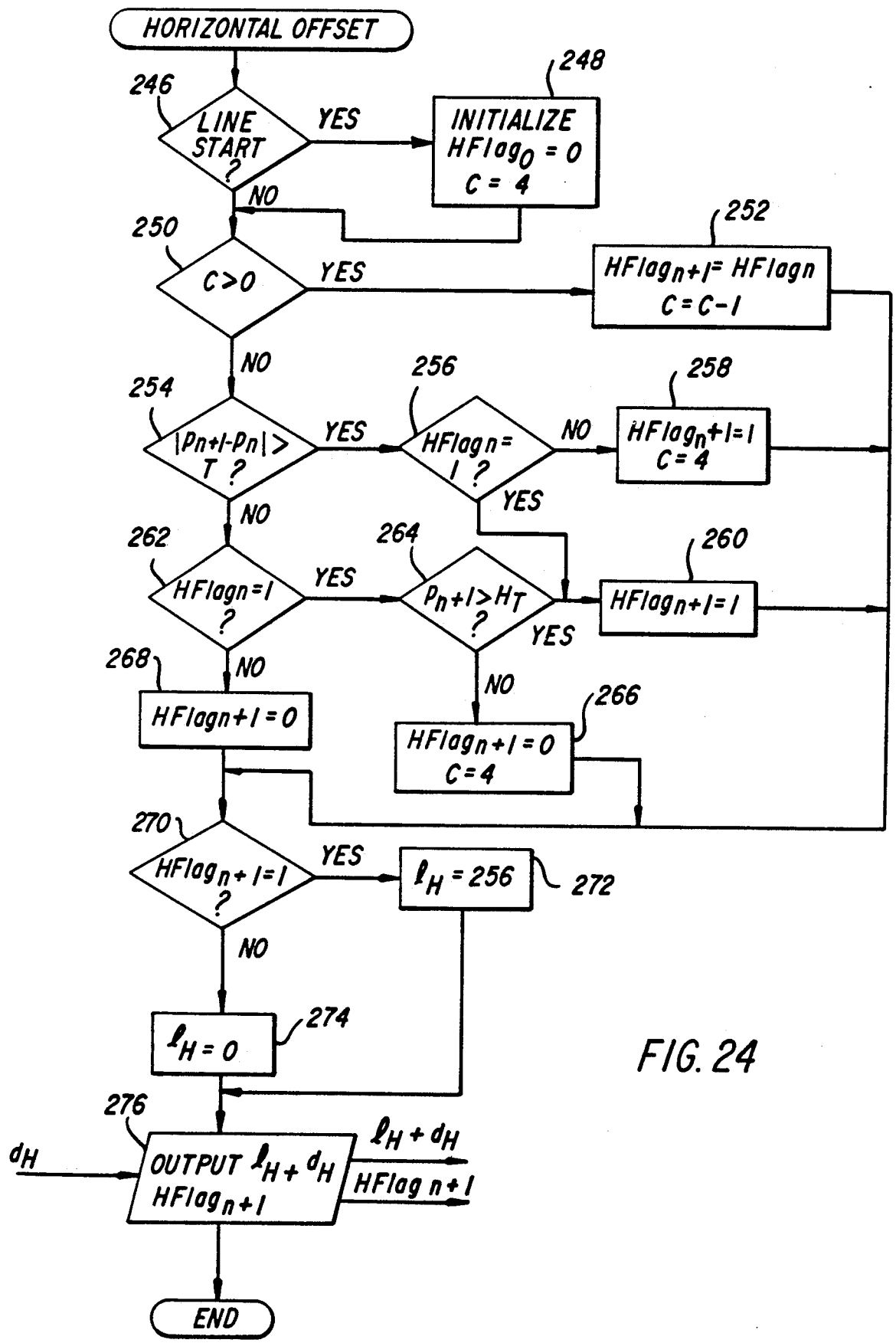
FIG. 24 is a flow chart showing the operation of the horizontal offset block shown in FIG. 22.

FIG. 24 is a flow chart showing how the horizontal offset block 240 implements these three rules to select the interpolation kernel. First, a check is made 246 to see if it is the start of a line. If so, the logic is initialized, setting a horizontal interpolation flag HFlag$_o$=0 (248), and initializing a counter C=4. HFlag=0 will indicate that the cubic convolution kernel is to be employed, and HFlag=1 will indicate replication. Each line starts off in the cubic convolution mode. If this is not the start of a line, a check is made (250) to see if C is greater than zero. If so, it means that four pixels have not yet been processed with the current kernel, and the flag for the next pix $P_{n+1}$ is set to be the same as for the last $P_n$, and the counter C is reduced by 1(252).

If the counter C is less than or equal to zero, a change can be made in the interpolation kernel, so a check is made (254) to see if $\uparrow \Delta P \uparrow$ is greater than the threshold T. If so, a check is made (256) to see if the previous pixel was in a replication kernel. If not, HFlag$_{n+1}$ set to 1 for replication, and the counter C is reset to 4 (258). If so, HFlag$_{n+1}$ is set to 1 for replication (260) but there is no need to reset the counter.

Returning to the test for $\uparrow \Delta P \uparrow$ (254), if $\uparrow \Delta P \uparrow$ is not greater than T, a check is made (262) to see if the previous pixel as per Rule 3 was employed in a replication kernel. If so, a check is made 264 to see if $P_{n+1} > H_T$. This is the point at which Rule 3 above is implemented. If $P_{n+1} > H_T$, the HFlag$_{n+1}$ is set for replication (260). If not, the HFlag$_{n+1}$ is set for cubic convolution (266).

Returning to the check 262, if the previous pixel was not employed in a replication kernel, HFlag$_{n+1}$ is set (268) for cubic convolution.

Next, the value of HFlag$_{n+1}$ is checked (270), and if it is a one, $1_H$ is set to 256 to select the replication kernel (272). If HFlag$_{n+1}$ is a zero, $1_H$ is set to zero to select the cubic convolution kernel (274).

Finally, $1_H$ is added to $d_H$ and sent to the LUT, and HFlag$_{n+1}$ is sent to the vertical offset block 242 to be used as described below (276).

Figure 25:
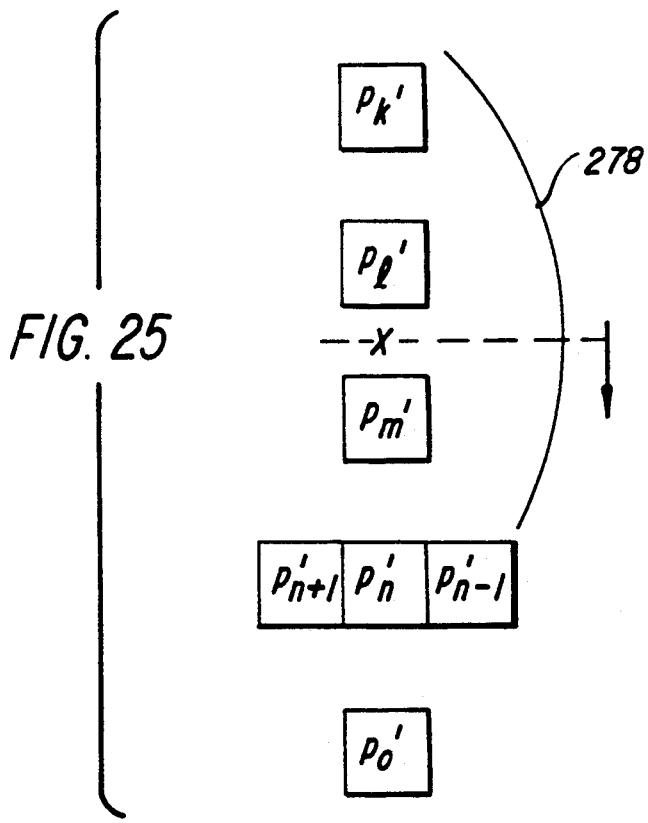
FIG. 25 is an illustration useful in describing the operation of the vertical offset block in the interpolation kernel selector.

The vertical offset block 242 receives the vertical displacement $d_v$, the interpolated pixel values P' and the HFlags, and produces the address $d_v+1_v$ that is sent to the LUT. An interrupt is also produced each time a change is made in interpolation kernels. FIG. 25 is an illustration showing a series of pixels $P'_k - P'_o$ in a column, and two pixels $P'_{n+1}$ and $P'_{n-1}$ immediately above and to the right and left of the next pixel $P'_o$ that will be employed by the interpolation kernel 278.

The vertical offset block 242 obeys the following rules in determining which interpolation kernel to employ:

Rule 1. If $\uparrow \Delta P' \uparrow > T$ switch to replication; if $\uparrow \Delta P' \uparrow < T$ switch to cubic convolution, where $\Delta P' = \uparrow P'_o - 40_n \uparrow$ and T is the predetermined threshold.

Rule 2. When a switch is made to a new interpolation kernel, stay with that kernel for at least 4 input pixels (except for rule 3); and Rule 3A. Since row interpolation is done before column interpolation, if replication was used on pixel $Pn_o$ or $P_{n+1}$ or $P_{n-1}$ and $P_o > H_T$, use replication on pixel $P_o$.

Rule 3 above implements hysteresis similar to the hysteresis in the horizontal offset block, with the difference that diagonal pixels above the next pixel can force the hysteresis, this is to account for diagonal features. The HFlags from the horizontal offset block are employed in implementing rule 3.

Figure 26:
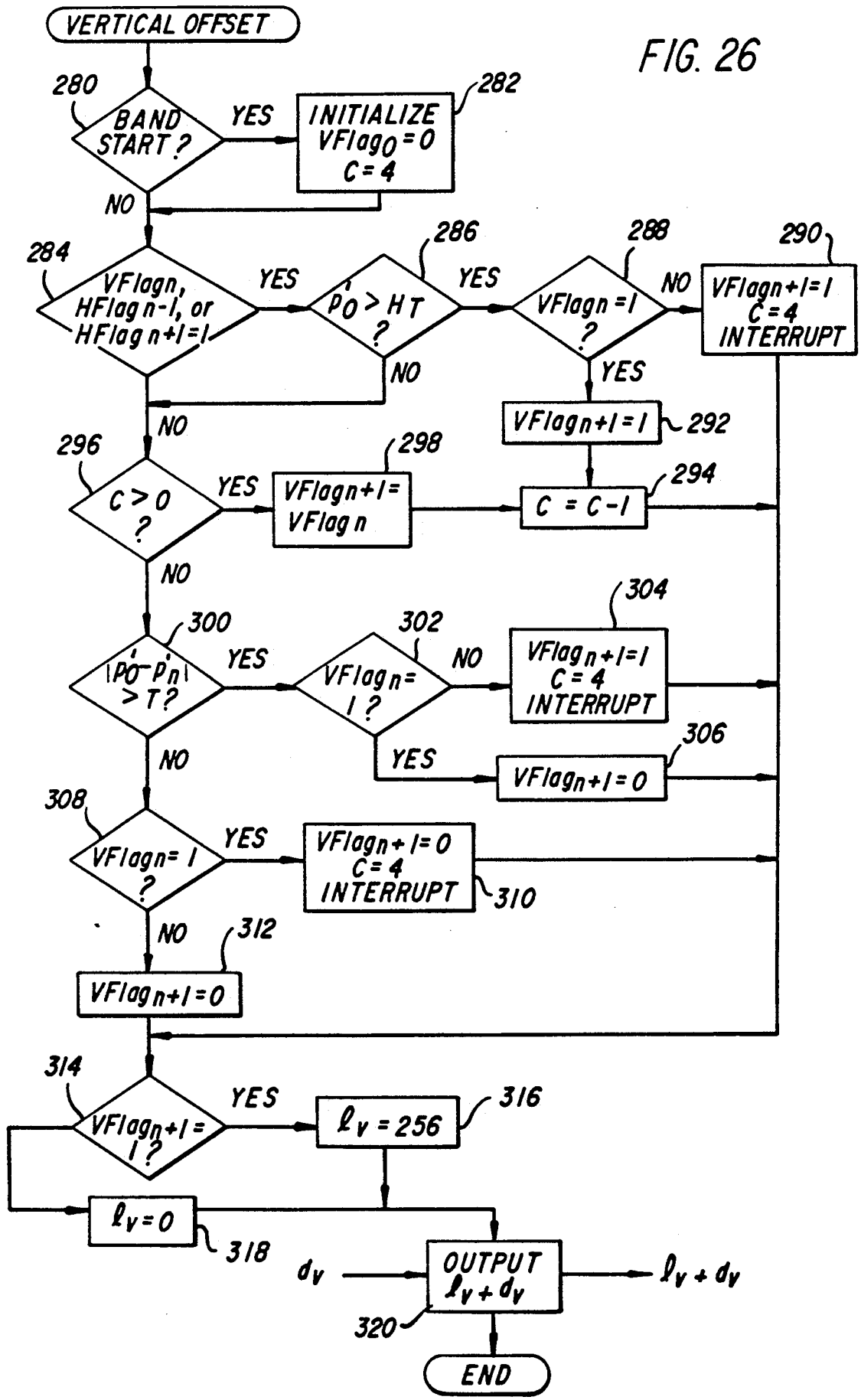
FIG. 26 is a flow chart showing the operation of the vertical offset block shown in FIG. 22.

FIG. 26 is a flow chart showing how the vertical offset block 242 implements the three rules stated above to select the interpolation kernel. First a check is made (280) to see if it is the start of a band. If so, an indicator VFlag$_o$ is set to 0 and a counter C is set to 4 (282).

When it is not the start of a band, a check is made (284) to see if replication was used on the previous pixel (VFlag$_n$=1) or the 2 previous diagonal pixels (HFlag$_{n+1}$or HFlag$_{n-1}$). If so, this pixel is a candidate for hysteresis. A check is made 286 to see if $P'_o > H_T$. If so, a further check is made (288) to see if the previous pixel P'$_n$ was employed in a replication kernel. If not, VFlag$_{n+1}$ is set to 1, the counter C is reset to 4 (290), and an interrupt is sent to the column multiply controller to stop computation till the new coefficients are loaded.

Returning to the check 288, if the previous pixel was employed in replication, VFlag$_{n+1}$ is set to 1 (292), and the count C is decremented 294.

Returning to the check 284, if none of the preceeding 3 pixels were employed in replication, a check is made (296) to see if the count is greater than zero. If so, VFlag$_{n+1}$ is set equal to VFlag$_n$ (298), and the counter C is decremented (294). If not, a check is made 300 to see if $\uparrow \Delta P' \uparrow > T$. If so, another check 302 is made to see if the previous pixel was employed in replication. If not, VFlag$_{n+1}$ is set to 1, the counter C is set to 4 (304), and an interrupt is sent to the column multiply controller.

If the previous pixel was not involved in replication, VFlag is set to 0 (306).

Returning to the check 300, if $\uparrow \Delta P' \uparrow$ is not greater than T, a check is made 308 to see if the previous pixel was employed in replication. If so, VFlag$_{n+1}$ is set to 0, the counter C is set to 4 (310) and the interrupt is sent to the column multiply controller. If not, VFlag$_{n+1}$ is simply set to 0 (312).

A check is made to see if VFlag$_{n+1}$ is set to 1, if so $1_v=256$ (316); if not $1_v=0$ (318).

Finally $1_v$ is added to dv and the sum is output to the LUT to retrieve the interpolation coefficients (320).

The interpolation selector 15 can be implemented as a programmed microprocessor, and the description given above will be sufficient to enable a programmer to program the microprocessor. Alternatively, for faster operation, the interpolation selector can be embodied in a state machine. Sufficient memory is provided in the interpolation selector to hold the Flags from the horizontal offset block 240 that are subsequently employed by the vertical offset block 242.

Although the interpolator according to the present invention has been described with respect to a preferred embodiment, where two interpolation kernels are employed (cubic convolution and replication) it will be understood that more than 2 kernels may be employed. For example, a number of cubic convolution kernels providing different degrees of edge enhancement may be employed, and the switch made between cubic convolution kernels when edges are detected, thereby providing selective edge enhancement in the interpolated images. Furthermore, cubic convolution kernels providing edge suppression can be employed with a detector for detecting low amplitude high frequency detail such as film grain in a digitized photograph. The edge suppressing kernel is selected in response to detecting such detail, thereby providing film grain suppression in the interpolated image.

Industrial Applicability and Advantages

The interpolator according to the present invention is useful for enlarging and reducing digital images such as diagnostic radiographs. The interpolator is advantageous in that an optimum interpolation can be performed on an image having a variety of kinds of subject matter by storing several interpolation kernels in the memory, and switching between different types of interpolation depending on the local content of the input image.

I claim:

1. Apparatus for performing interpolation on an input digital image signal having pixel values representing rows and columns of pixels, to produce an interpolated digital image that has more (magnified) or fewer (reduced) pixels, comprising:
   a. an interpolation kernel lookup table containing first and second interpolation kernel coefficients;
   b. row interpolator means for receiving the input digital image signal, and interpolating in row direction, by retrieving interpolation coefficient values from the interpolation kernel lookup table, and applying the coefficient values to a subset of pixel values in a row to produce interpolated pixel values;
   c. column interpolator means for receiving rows of interpolated pixel values from the row interpolator means and preforming interpolation in a column direction by retrieving interpolation coefficient values from the interpolation lookup table, and applying the coefficient values to subsets of pixel values in a column; and
   d. interpolation selection means for receiving the input digital image signal input to the row interpolator means, and in response thereto, for selecting said first or second interpolation kernel for row interpolation, and for receiving the interpolated signal values from the row interpolation means, and in response thereto, for selecting said first or second interpolation kernel for column interpolation.

2. Apparatus claimed in claim 1, wherein said first interpolation kernel is for cubic convolution, and said second interpolation kernel is for replication, and wherein said interpolation selection means selects replication when the difference between successive pixel values exceeds a predetermined threshold.

3. Apparatus claimed in claim 2, wherein said interpolation kernels employ a number of pixels and said interpolation selection means maintains a selection for at least the number of pixels employed by the selected kernel.

4. Apparatus claimed in claim 2, wherein said interpolation selection means detects when a new pixel value is greater than a predetermined threshold, and if an adjacent pixel was employed in replication, employing replication on the new pixel value.

* * * * *